US012701433B2

(12) United States Patent
Hanif et al.

(10) Patent No.: US 12,701,433 B2
(45) Date of Patent: Aug. 4, 2026

(54) TECHNIQUES FOR ACTIVATING SIDELINK CARRIER AGGREGATION DURING A SWITCH FROM DIRECT TO INDIRECT COMMUNICATION

(71) Applicant: QUALCOMM Incorporated, San Diego, CA (US)

(72) Inventors: Ahmed Farhan Hanif, Versailles (FR); Jelena Damnjanovic, Del Mar, CA (US); Tao Luo, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 466 days.

(21) Appl. No.: 18/164,473

(22) Filed: Feb. 3, 2023

(65) Prior Publication Data

US 2024/0267754 A1    Aug. 8, 2024

(51) Int. Cl.
| | |
|---|---|
| *H04W 24/02* | (2009.01) |
| *H04L 5/00* | (2006.01) |
| *H04W 24/08* | (2009.01) |
| *H04W 24/10* | (2009.01) |
| *H04W 56/00* | (2009.01) |
| *H04W 74/0833* | (2024.01) |
| *H04W 76/14* | (2018.01) |

(52) U.S. Cl.
CPC ............. *H04W 24/02* (2013.01); *H04L 5/001* (2013.01); *H04W 24/08* (2013.01); *H04W 24/10* (2013.01); *H04W 56/001* (2013.01); *H04W 74/0833* (2013.01); *H04W 76/14* (2018.02)

(58) Field of Classification Search
CPC ..... H04W 24/02; H04W 24/08; H04W 24/10; H04W 56/001; H04W 74/0833; H04W 76/14; H04L 5/001
See application file for complete search history.

(56) References Cited

U.S. PATENT DOCUMENTS

| | | | | |
|---|---|---|---|---|
| 2014/0056243 A1* | 2/2014 | Pelletier | ............... | H04W 76/15 370/329 |
| 2015/0341881 A1* | 11/2015 | Hiltunen | ............... | H04W 56/00 370/350 |
| 2017/0041891 A1* | 2/2017 | Chae | .................... | H04W 56/001 |
| 2017/0171899 A1* | 6/2017 | Seo | ......................... | H04W 88/04 |
| 2018/0091964 A1* | 3/2018 | Adachi | ................... | H04W 8/00 |
| 2019/0281587 A1* | 9/2019 | Zhang | .................... | H04W 72/23 |
| 2020/0092685 A1* | 3/2020 | Fehrenbach | ........... | H04W 36/08 |
| 2021/0014785 A1* | 1/2021 | Vaze | ............. | H04W 36/008357 |

(Continued)

*Primary Examiner* — Qun Shen
(74) *Attorney, Agent, or Firm* — Holland & Hart LLP

(57) ABSTRACT

Methods, systems, and devices for wireless communications are described. In some systems, a first user equipment (UE), a second UE, and a network entity may support one or more configuration- or signaling-based mechanisms according to which the network entity may activate sidelink carrier aggregation (CA) between the first UE and the second UE during, as part of, or in association with a switch from direct communication between the first UE and the network entity to indirect communication between the first UE and the network entity via the second UE. In some examples, the configuration- or signaling-based mechanisms supported by the first UE, the second UE, and the network entity may be associated with whether the second UE (e.g., the relay node) is in a Radio Resource Control (RRC) connected state, an RRC idle state, or an RRC inactive state.

29 Claims, 17 Drawing Sheets

(56)  References Cited

U.S. PATENT DOCUMENTS

| | | | | |
|---|---|---|---|---|
| 2021/0037403 A1* | 2/2021 | Kim | ....................... | H04W 76/27 |
| 2021/0227442 A1* | 7/2021 | Yiu | ................. | H04W 36/00837 |
| 2021/0337455 A1* | 10/2021 | Zhou | ................ | H04W 36/0061 |
| 2024/0155671 A1* | 5/2024 | Kalbasi | ............... | H04W 74/006 |
| 2025/0023699 A1* | 1/2025 | Leng | .................... | H04W 76/00 |

* cited by examiner 1110          1120          1115

1105

1100

130

105

115

Network
Entity

Transceiver

1410

Antenna

1415

Communications
Manager

1420

Memory

Code

1430

1425

1440

Processor

1435

1405

1400

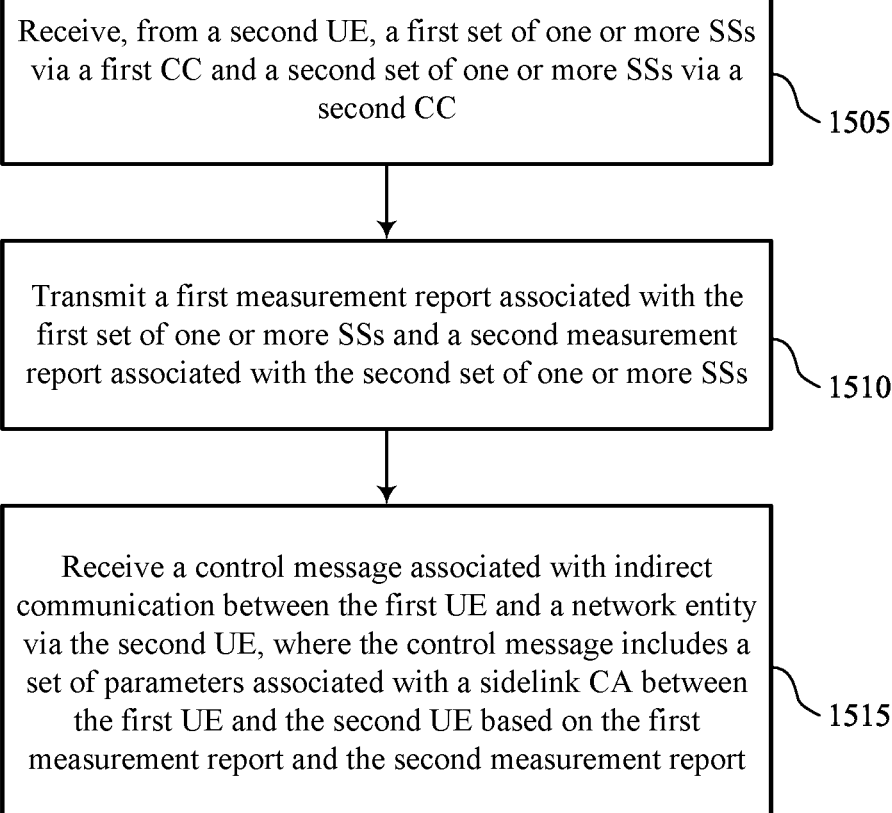

Receive, from a second UE, a first set of one or more SSs via a first CC and a second set of one or more SSs via a second CC

⟍ 1505

Transmit a first measurement report associated with the first set of one or more SSs and a second measurement report associated with the second set of one or more SSs

⟍ 1510

Receive a control message associated with indirect communication between the first UE and a network entity via the second UE, where the control message includes a set of parameters associated with a sidelink CA between the first UE and the second UE based on the first measurement report and the second measurement report

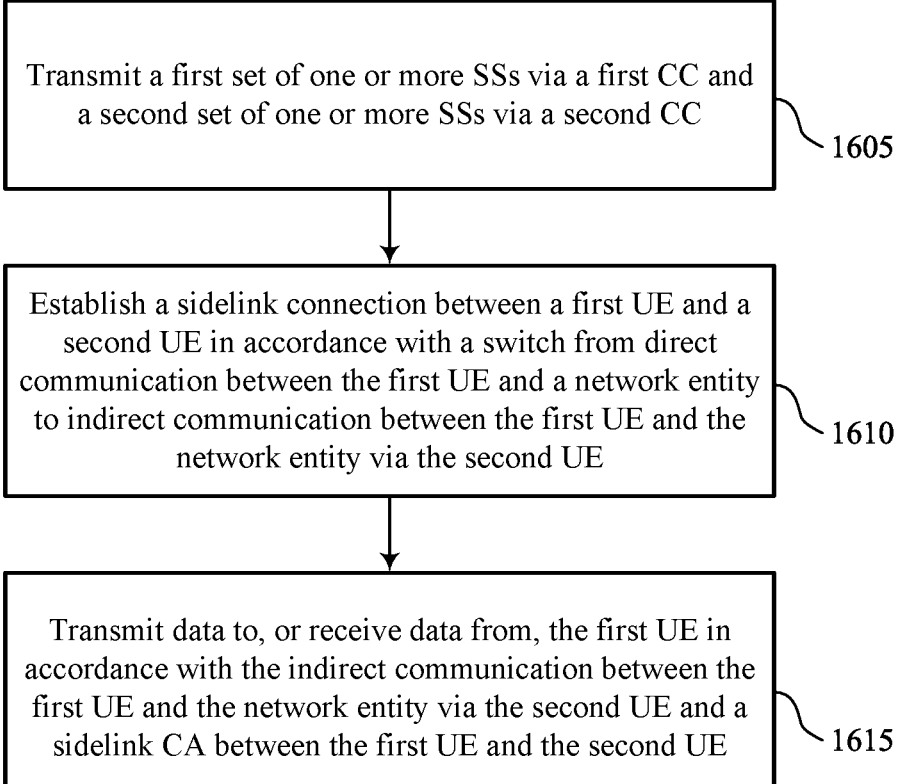

Transmit a first set of one or more SSs via a first CC and a second set of one or more SSs via a second CC

1605

Establish a sidelink connection between a first UE and a second UE in accordance with a switch from direct communication between the first UE and a network entity to indirect communication between the first UE and the network entity via the second UE

1610

Transmit data to, or receive data from, the first UE in accordance with the indirect communication between the first UE and the network entity via the second UE and a sidelink CA between the first UE and the second UE

Figure 17:
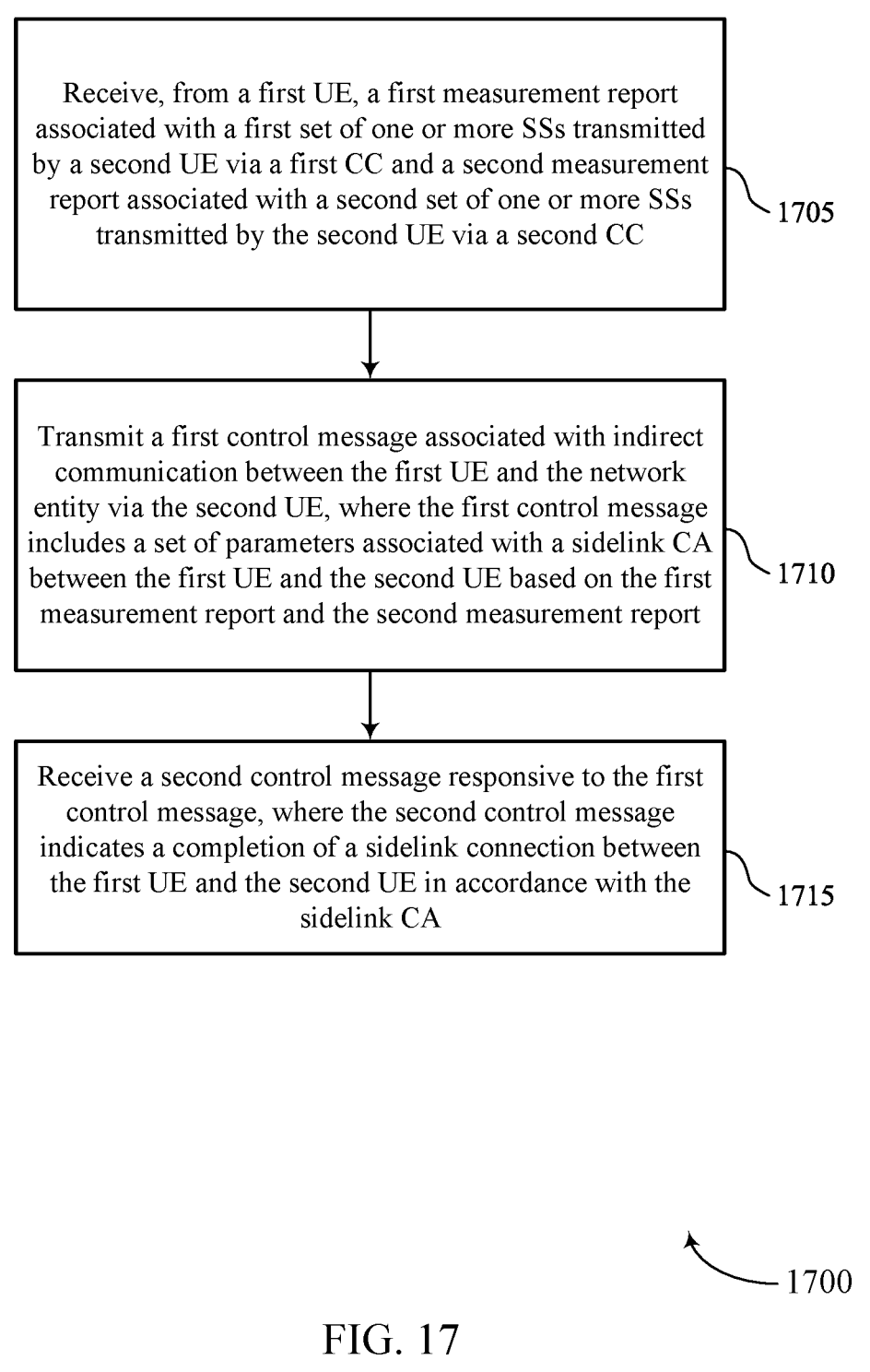

Receive, from a first UE, a first measurement report associated with a first set of one or more SSs transmitted by a second UE via a first CC and a second measurement report associated with a second set of one or more SSs transmitted by the second UE via a second CC

1705

Transmit a first control message associated with indirect communication between the first UE and the network entity via the second UE, where the first control message includes a set of parameters associated with a sidelink CA between the first UE and the second UE based on the first measurement report and the second measurement report

1710

Receive a second control message responsive to the first control message, where the second control message indicates a completion of a sidelink connection between the first UE and the second UE in accordance with the sidelink CA

TECHNIQUES FOR ACTIVATING SIDELINK CARRIER AGGREGATION DURING A SWITCH FROM DIRECT TO INDIRECT COMMUNICATION

FIELD OF TECHNOLOGY

The following relates to wireless communications, including techniques for activating sidelink carrier aggregation (CA) during a switch from direct to indirect communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, a UE may communicate with a network entity indirectly, such as via a relay node. For example, a first UE may communicate with a network indirectly via a second UE, where the second UE acts as a relay between the first UE and the network entity.

SUMMARY

The described techniques relate to improved methods, systems, devices, and apparatuses that support techniques for activating sidelink carrier aggregation (CA) during a switch from direct to indirect communication. For example, a first user equipment (UE) may initially communicate with a network entity via a direct communication link between the first UE and the network entity and may switch from communicating via the direct communication link to communicating via an indirect communication link via a second UE. Before or after establishing a sidelink connection between the first UE and the second UE, the first UE may receive and measure one or more synchronization signals (SSs) transmitted by the second UE via multiple component carriers. The first UE may transmit measurement reports associated with the SS measurements and the first UE may receive a control message (e.g., a reconfiguration message) including a set of parameters associated with establishing sidelink CA between the first UE and the second UE. As such, the first UE and the second UE may establish and communicate in accordance with sidelink CA while the second UE acts or functions as a relay between the first UE and the network entity.

A method for wireless communication at a first UE is described. The method may include receiving, from a second UE, a first set of one or more SSs via a first component carrier (CC) and a second set of one or more SSs via a second CC, transmitting a first measurement report associated with the first set of one or more SSs and a second measurement report associated with the second set of one or more SSs, and receiving a control message associated with indirect communication between the first UE and a network entity via the second UE, where the control message includes a set of parameters associated with a sidelink CA between the first UE and the second UE based on the first measurement report and the second measurement report.

An apparatus for wireless communication at a first UE is described. The apparatus may include a processor, memory coupled with the processor, and instructions stored in the memory. The instructions may be executable by the processor to cause the apparatus to receive, from a second UE, a first set of one or more SSs via a first CC and a second set of one or more SSs via a second CC, transmit a first measurement report associated with the first set of one or more SSs and a second measurement report associated with the second set of one or more SSs, and receive a control message associated with indirect communication between the first UE and a network entity via the second UE, where the control message includes a set of parameters associated with a sidelink CA between the first UE and the second UE based on the first measurement report and the second measurement report.

Another apparatus for wireless communication at a first UE is described. The apparatus may include means for receiving, from a second UE, a first set of one or more SSs via a first CC and a second set of one or more SSs via a second CC, means for transmitting a first measurement report associated with the first set of one or more SSs and a second measurement report associated with the second set of one or more SSs, and means for receiving a control message associated with indirect communication between the first UE and a network entity via the second UE, where the control message includes a set of parameters associated with a sidelink CA between the first UE and the second UE based on the first measurement report and the second measurement report.

A non-transitory computer-readable medium storing code for wireless communication at a first UE is described. The code may include instructions executable by a processor to receive, from a second UE, a first set of one or more SSs via a first CC and a second set of one or more SSs via a second CC, transmit a first measurement report associated with the first set of one or more SSs and a second measurement report associated with the second set of one or more SSs, and receive a control message associated with indirect communication between the first UE and a network entity via the second UE, where the control message includes a set of parameters associated with a sidelink CA between the first UE and the second UE based on the first measurement report and the second measurement report.

Some examples of the method, apparatuses, and non-transitory computer-readable medium described herein may further include operations, features, means, or instructions for establishing a sidelink connection between the first UE and the second UE based on the control message, where the control message further includes a second set of parameters associated with a switch from direct communication between the first UE and the network entity to the indirect communication between the first UE and the network entity via the second UE.

Some examples of the method, apparatuses, and non-transitory computer-readable medium described herein may further include operations, features, means, or instructions for receiving a second control message associated with a switch from direct communication between the first UE and the network entity to the indirect communication between the first UE and the network entity via the second UE, where the second control message includes a second set of parameters associated with the switch and establishing a sidelink connection between the first UE and the second UE based on the second control message.

Some examples of the method, apparatuses, and non-transitory computer-readable medium described herein may further include operations, features, means, or instructions for receiving, from the network entity, a request to measure the second set of one or more SSs via the second CC and to transmit the second measurement report, where receiving the second set of one or more SSs and transmitting the second measurement report may be based on receiving the request.

Some examples of the method, apparatuses, and non-transitory computer-readable medium described herein may further include operations, features, means, or instructions for transmitting a second control message responsive to the control message, where the second control message indicates a completion of a sidelink connection between the first UE and the second UE in accordance with the sidelink CA.

Some examples of the method, apparatuses, and non-transitory computer-readable medium described herein may further include operations, features, means, or instructions for receiving, from the second UE and in accordance with a sidelink connection establishment procedure, a random access channel message based on a radio frequency band of a sidelink connection between the first UE and the second UE and transmitting, to the second UE, a random access channel response message based on receiving the random access channel message.

Some examples of the method, apparatuses, and non-transitory computer-readable medium described herein may further include operations, features, means, or instructions for transmitting data to, or receiving data from, the network entity via the second UE in accordance with the indirect communication between the first UE and the network entity via the second UE and the sidelink CA between the first UE and the second UE.

A method for wireless communication is described. The method may include transmitting a first set of one or more SSs via a first CC and a second set of one or more SSs via a second CC, establishing a sidelink connection between a first UE and a second UE in accordance with a switch from direct communication between the first UE and a network entity to indirect communication between the first UE and the network entity via the second UE, and transmitting data to, or receiving data from, the first UE in accordance with the indirect communication between the first UE and the network entity via the second UE and a sidelink CA between the first UE and the second UE.

An apparatus for wireless communication is described. The apparatus may include a processor, memory coupled with the processor, and instructions stored in the memory. The instructions may be executable by the processor to cause the apparatus to transmit a first set of one or more SSs via a first CC and a second set of one or more SSs via a second CC, establish a sidelink connection between a first UE and a second UE in accordance with a switch from direct communication between the first UE and a network entity to indirect communication between the first UE and the network entity via the second UE, and transmit data to, or receive data from, the first UE in accordance with the indirect communication between the first UE and the network entity via the second UE and a sidelink CA between the first UE and the second UE.

Another apparatus for wireless communication is described. The apparatus may include means for transmitting a first set of one or more SSs via a first CC and a second set of one or more SSs via a second CC, means for establishing a sidelink connection between a first UE and a second UE in accordance with a switch from direct communication between the first UE and a network entity to indirect communication between the first UE and the network entity via the second UE, and means for transmitting data to, or receiving data from, the first UE in accordance with the indirect communication between the first UE and the network entity via the second UE and a sidelink CA between the first UE and the second UE.

A non-transitory computer-readable medium storing code for wireless communication is described. The code may include instructions executable by a processor to transmit a first set of one or more SSs via a first CC and a second set of one or more SSs via a second CC, establish a sidelink connection between a first UE and a second UE in accordance with a switch from direct communication between the first UE and a network entity to indirect communication between the first UE and the network entity via the second UE, and transmit data to, or receive data from, the first UE in accordance with the indirect communication between the first UE and the network entity via the second UE and a sidelink CA between the first UE and the second UE.

Some examples of the method, apparatuses, and non-transitory computer-readable medium described herein may further include operations, features, means, or instructions for receiving, from the network entity, a request to transmit the second set of one or more SSs via the second CC, where transmitting the second set of one or more SSs via the second CC may be based on receiving the request.

Some examples of the method, apparatuses, and non-transitory computer-readable medium described herein may further include operations, features, means, or instructions for receiving, from the network entity, a sidelink CA capability inquiry message and transmitting, to the network entity in response to the sidelink CA capability inquiry message, an indication of a sidelink CA capability of the second UE, where receiving the request to transmit the second set of one or more SSs via the second CC may be based on transmitting the indication of the sidelink CA capability of the second UE.

Some examples of the method, apparatuses, and non-transitory computer-readable medium described herein may further include operations, features, means, or instructions for receiving, from the first UE, a measurement report associated with the second set of one or more SSs and transmitting, to the network entity, the measurement report received from the first UE.

Some examples of the method, apparatuses, and non-transitory computer-readable medium described herein may further include operations, features, means, or instructions for receiving, from the first UE, a control message that indicates a completion of the sidelink connection between the first UE and the second UE in accordance with the sidelink CA and transmitting, to the network entity, the control message received from the first UE.

Some examples of the method, apparatuses, and non-transitory computer-readable medium described herein may further include operations, features, means, or instructions for transmitting, to the first UE and in accordance with a sidelink connection establishment procedure, a random access channel message based on a radio frequency band of a sidelink connection between the first UE and the second UE and receiving, from the first UE, a random access channel response message based on transmitting the random access channel message.

Some examples of the method, apparatuses, and non-transitory computer-readable medium described herein may further include operations, features, means, or instructions for establishing the sidelink connection between the first UE and the second UE may be based on the first set of one or more SSs or may be based on both the first set of one or more SSs and the second set of one or more SSs.

In some examples of the method, apparatuses, and non-transitory computer-readable medium described herein, the sidelink CA may be based on the first set of one or more SSs and the second set of one or more SSs.

A method for wireless communication at a network entity is described. The method may include receiving, from a first UE, a first measurement report associated with a first set of one or more SSs transmitted by a second UE via a first CC and a second measurement report associated with a second set of one or more SSs transmitted by the second UE via a second CC, transmitting a first control message associated with indirect communication between the first UE and the network entity via the second UE, where the first control message includes a set of parameters associated with a sidelink CA between the first UE and the second UE based on the first measurement report and the second measurement report, and receiving a second control message responsive to the first control message, where the second control message indicates a completion of a sidelink connection between the first UE and the second UE in accordance with the sidelink CA.

An apparatus for wireless communication at a network entity is described. The apparatus may include a processor, memory coupled with the processor, and instructions stored in the memory. The instructions may be executable by the processor to cause the apparatus to receive, from a first UE, a first measurement report associated with a first set of one or more SSs transmitted by a second UE via a first CC and a second measurement report associated with a second set of one or more SSs transmitted by the second UE via a second CC, transmit a first control message associated with indirect communication between the first UE and the network entity via the second UE, where the first control message includes a set of parameters associated with a sidelink CA between the first UE and the second UE based on the first measurement report and the second measurement report, and receive a second control message responsive to the first control message, where the second control message indicates a completion of a sidelink connection between the first UE and the second UE in accordance with the sidelink CA.

Another apparatus for wireless communication at a network entity is described. The apparatus may include means for receiving, from a first UE, a first measurement report associated with a first set of one or more SSs transmitted by a second UE via a first CC and a second measurement report associated with a second set of one or more SSs transmitted by the second UE via a second CC, means for transmitting a first control message associated with indirect communication between the first UE and the network entity via the second UE, where the first control message includes a set of parameters associated with a sidelink CA between the first UE and the second UE based on the first measurement report and the second measurement report, and means for receiving a second control message responsive to the first control message, where the second control message indicates a completion of a sidelink connection between the first UE and the second UE in accordance with the sidelink CA.

A non-transitory computer-readable medium storing code for wireless communication at a network entity is described. The code may include instructions executable by a processor to receive, from a first UE, a first measurement report associated with a first set of one or more SSs transmitted by a second UE via a first CC and a second measurement report associated with a second set of one or more SSs transmitted by the second UE via a second CC, transmit a first control message associated with indirect communication between the first UE and the network entity via the second UE, where the first control message includes a set of parameters associated with a sidelink CA between the first UE and the second UE based on the first measurement report and the second measurement report, and receive a second control message responsive to the first control message, where the second control message indicates a completion of a sidelink connection between the first UE and the second UE in accordance with the sidelink CA.

Some examples of the method, apparatuses, and non-transitory computer-readable medium described herein may further include operations, features, means, or instructions for transmitting, to the second UE, a request to transmit the second set of one or more SSs via the second CC, where receiving the second measurement report may be based on transmitting the request.

Some examples of the method, apparatuses, and non-transitory computer-readable medium described herein may further include operations, features, means, or instructions for transmitting, to the second UE, a sidelink CA capability inquiry message and receiving, from the second UE in response to the sidelink CA capability inquiry message, an indication of a sidelink CA capability of the second UE, where transmitting the request to transmit the second set of one or more SSs via the second CC may be based on receiving the indication of the sidelink CA capability of the second UE.

Some examples of the method, apparatuses, and non-transitory computer-readable medium described herein may further include operations, features, means, or instructions for transmitting, to the first UE, a request to measure the second set of one or more SSs via the second CC and to transmit the second measurement report, where receiving the second measurement report may be based on transmitting the request.

In some examples of the method, apparatuses, and non-transitory computer-readable medium described herein, the first control message further includes a second set of parameters associated with a switch from direct communication between the first UE and the network entity to the indirect communication between the first UE and the network entity via the second UE and transmitting the first control message may be based on both the first measurement report and the second measurement report.

Some examples of the method, apparatuses, and non-transitory computer-readable medium described herein may further include operations, features, means, or instructions for transmitting, to the first UE, a third control message associated with a switch from direct communication between the first UE and the network entity to the indirect communication between the first UE and the network entity via the second UE, where the third control message includes a second set of parameters associated with the switch.

In some examples of the method, apparatuses, and non-transitory computer-readable medium described herein, the third control message may be transmitted prior to the first control message, transmitting the third control message may be based on the first measurement report, and transmitting the first control message may be based on the second measurement report.

Some examples of the method, apparatuses, and non-transitory computer-readable medium described herein may further include operations, features, means, or instructions for transmitting data to, or receiving data from, the second UE in accordance with the indirect communication between the first UE and the network entity via the second UE and the sidelink CA between the first UE and the second UE.

BRIEF DESCRIPTION OF THE DRAWINGS

FIGS. 15 through 17 illustrate flowcharts showing methods that support techniques for activating sidelink CA during a switch from direct to indirect communication in accordance with one or more aspects of the present disclosure.

DETAILED DESCRIPTION

Figure 1:
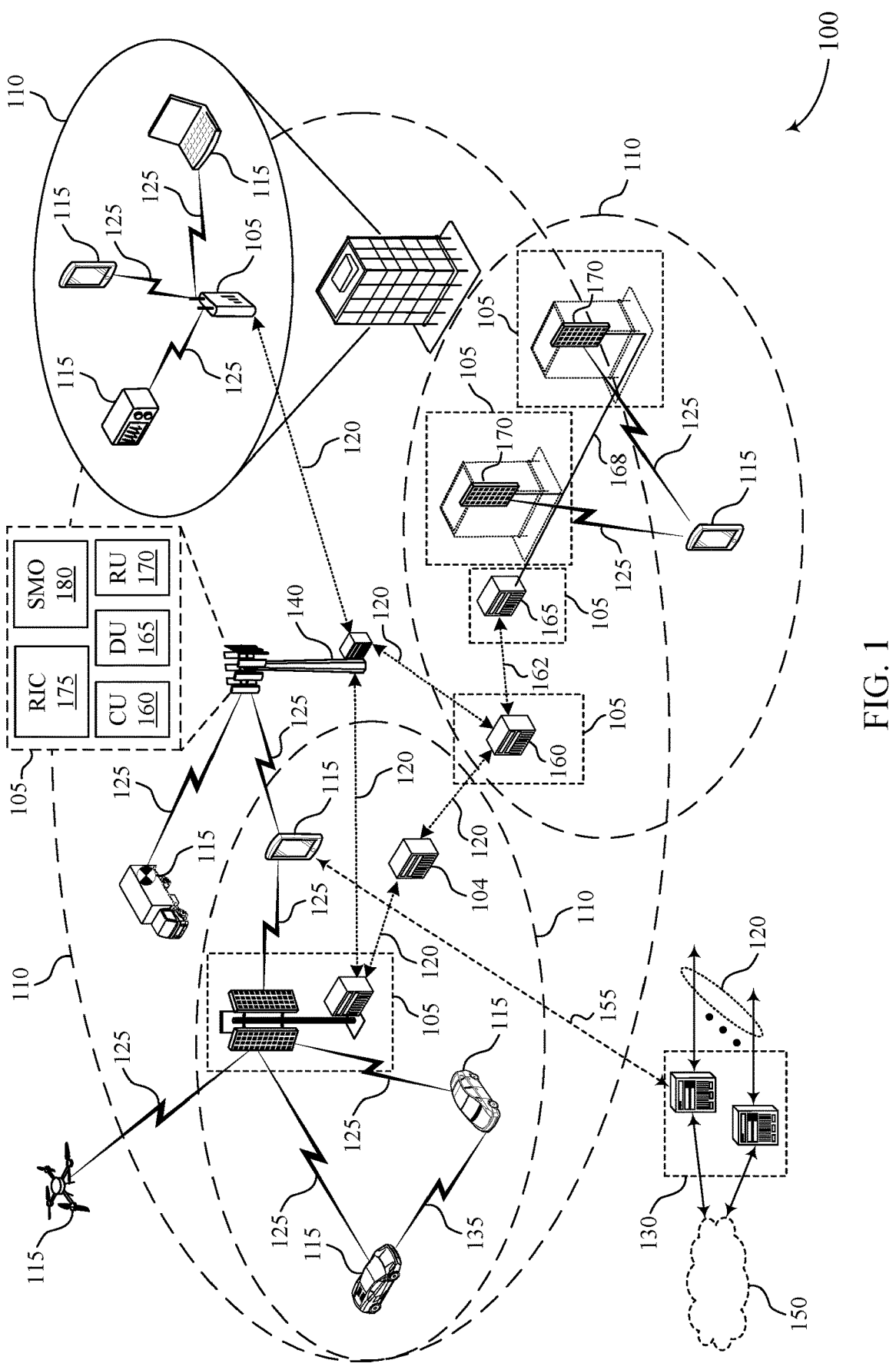
FIGS. 1 and 2 illustrate examples of wireless communications systems that support techniques for activating sidelink carrier aggregation (CA) during a switch from direct to indirect communication in accordance with one or more aspects of the present disclosure.

In some wireless communications systems, various devices may support one or more commercial use cases, such as a network controlled interactive service (NCIS) or extended reality (XR) use cases, that may be associated with relatively high throughputs and that may be relatively latency sensitive. To support such use cases, some devices may employ mechanisms according to which the devices are able to increase spectrum utilization efficiency and reduce latency. One such mechanism may include offloading Uu traffic via sidelink. Further, some devices may support relatively higher frequency sidelink communication, such as millimeter wave (mmW) sidelink communication, as such higher frequency sidelink communication may be associated with relatively greater amounts of available spectrum to satisfy strict throughput and latency constraints. Additionally, some devices may support sidelink carrier aggregation (CA) at higher frequencies, which may further increase an achievable throughput. Some systems, however, may lack a mechanism according to which sidelink CA can be activated during, as part of, or in association with an offloading of Uu traffic to sidelink, which may hinder an achievable throughput and adversely impact latency.

In some implementations, a first user equipment (UE), a second UE, and a network entity may support one or more configuration- or signaling-based mechanisms according to which the network entity may activate sidelink CA between the first UE and the second UE during, as part of, or in association with a switch from direct communication between the first UE and the network entity to indirect communication between the first UE and the network entity via the second UE. In some examples, the configuration- or signaling-based mechanisms supported by the first UE, the second UE, and the network entity may be associated with (e.g., based on or depend on) whether the second UE (e.g., the relay node) is in a Radio Resource Control (RRC) connected state, an RRC idle state, or an RRC inactive state. For example, the first UE, the second UE, and the network entity may employ a first set of one or more configuration- or signaling-based mechanisms if the second UE is in an RRC connected state, a second set of one or more configuration- or signaling-based mechanisms if the second UE is in an RRC idle state, and a third set of one or more configuration- or signaling-based mechanisms if the second UE is in an RRC inactive state.

Across such various configuration- or signaling-based mechanisms that the first UE, the second UE, and the network entity may employ, the first UE may receive and measure a first set of one or more synchronization signals (SSs) transmitted by the second UE via a first component carrier (CC) and a second set of one or more SSs transmitted by the second UE via a second CC. The first UE may transmit a first measurement report associated with the first set of SSs and a second measurement report associated with the second set of SSs and may receive, based on the first and second measurement reports, a first control message (e.g., a reconfiguration message) including a set of sidelink CA parameters. The first UE and the second UE may establish a sidelink connection based on the set of sidelink CA parameters (if the sidelink connection has yet to be established) or may reconfigure the sidelink connection based on the set of sidelink CA parameters (if the sidelink connection has already been established). The first UE may transmit a second control message (e.g., a reconfiguration complete message) responsive to the first control message indicating that sidelink CA between the first UE and the second UE is complete and, accordingly, may transmit data to, or receive data from, the network entity indirectly via the second UE in accordance with the sidelink CA.

Particular implementations of the subject matter described in this disclosure can be implemented to realize one or more of the following potential advantages. For example, as a result of supporting such configuration- or signaling-based mechanisms to activate sidelink CA during, as part of, or in association with a switch from direct communication between the first UE and the network entity to indirect communication between the first UE and the network entity via the second UE, the network entity may offload the first UE from Uu traffic to sidelink with low latency while still maintaining a relatively high achievable throughput (e.g., such as an approximately gigabit per second (Gbit/sec) throughput). As such, the network entity may facilitate greater spectrum utilization efficiency and reduced latency for various use cases. In other words, the first UE, the second UE, and the network entity, among other devices in the system, may experience higher data rates, greater capacity, and greater spectral efficiency, among other benefits.

Aspects of the disclosure are initially described in the context of wireless communications systems. Aspects of the disclosure are additionally illustrated by and described with reference to process flows. Aspects of the disclosure are further illustrated by and described with reference to apparatus diagrams, system diagrams, and flowcharts that relate to techniques for activating sidelink CA during a switch from direct to indirect communication.

FIG. 1 illustrates an example of a wireless communications system 100 that supports techniques for activating sidelink carrier aggregation during a switch from direct to indirect communication in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor.

One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for activating sidelink carrier aggregation during a switch from direct to indirect communication as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval. HARQ feedback may include an acknowledgment (ACK) or a negative acknowledgment (NACK) and may be equivalently referred to herein as HARQ-ACK.

In some implementations, a first UE 115, a second UE 115, and a network entity 105 may support one or more configuration- or signaling-based mechanisms according to which the network entity 105 may activate sidelink CA between the first UE 115 and the second UE 115 during, as part of, or in association with a switch from direct communication between the first UE 115 and the network entity 105 to indirect communication between the first UE 115 and the network entity 105 via the second UE 115. In some examples, the configuration- or signaling-based mechanisms supported by the first UE 115, the second UE 115, and the network entity 105 may be associated with (e.g., based on or depend on) whether the second UE 115 (e.g., the relay node)

is in an RRC connected state, an RRC idle state, or an RRC inactive state. For example, the first UE 115, the second UE 115, and the network entity 105 may employ a first set of one or more configuration- or signaling-based mechanisms if the second UE 115 is in an RRC connected state, a second set of one or more configuration- or signaling-based mechanisms if the second UE 115 is in an RRC idle state, and a third set of one or more configuration- or signaling-based mechanisms if the second UE 115 is in an RRC inactive state.

Across such various configuration- or signaling-based mechanisms that the first UE 115, the second UE 115, and the network entity 105 may employ, the first UE 115 may receive and measure a first set of one or more SSs transmitted by the second UE 115 via a first CC and a second set of one or more SSs transmitted by the second UE 115 via a second CC. The first UE 115 may transmit a first measurement report associated with the first set of SSs and a second measurement report associated with the second set of SSs and may receive, based on the first and second measurement reports, a first control message (e.g., a reconfiguration message) including a set of sidelink CA parameters. The first UE 115 and the second UE 115 may establish a sidelink connection based on the set of sidelink CA parameters (if the sidelink connection has yet to be established) or may reconfigure the sidelink connection based on the set of sidelink CA parameters (if the sidelink connection has already been established). The first UE 115 may transmit a second control message (e.g., a reconfiguration complete message) responsive to the first control message indicating that sidelink CA between the first UE 115 and the second UE 115 is complete and, accordingly, may transmit data to, or receive data from, the network entity 105 indirectly via the second UE 115 in accordance with the sidelink CA.

Figure 2:
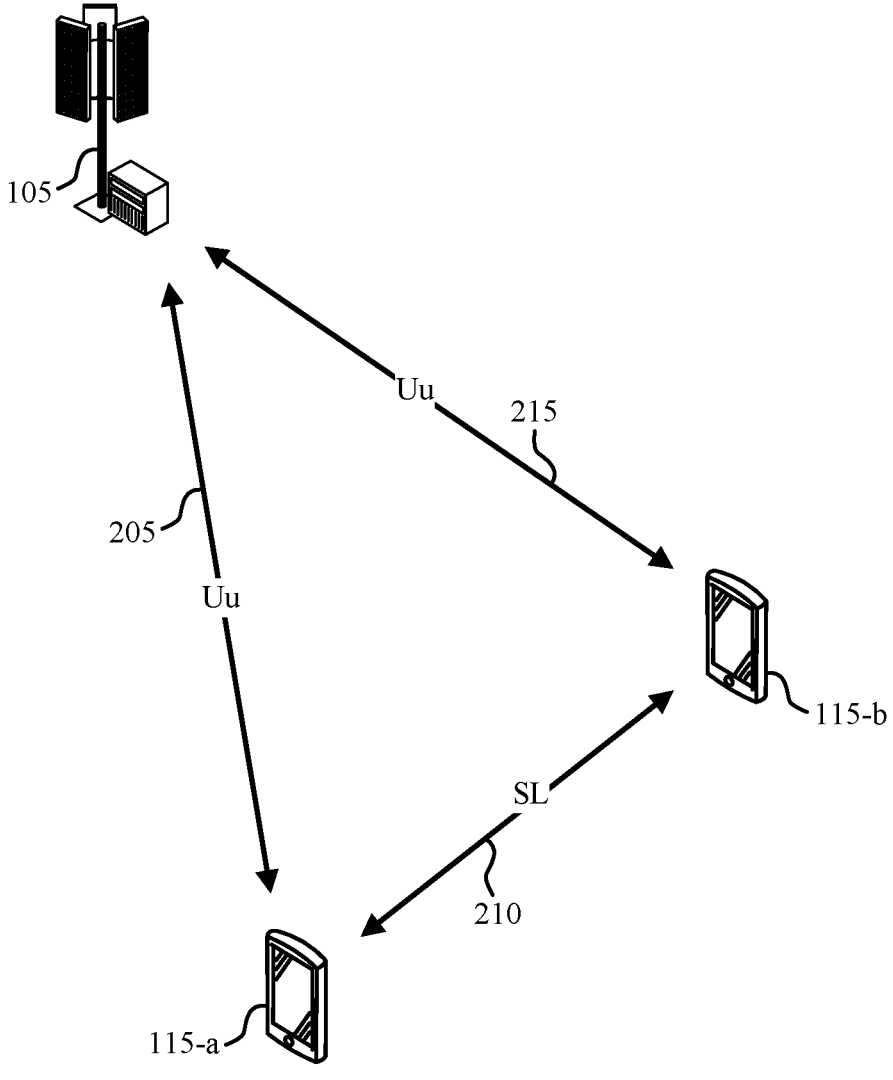

FIG. 2 illustrates an example of a wireless communications system 200 that supports techniques for activating sidelink CA during a switch from direct to indirect communication in accordance with one or more aspects of the present disclosure. The wireless communications system 200 illustrates communication between a UE 115-a, a UE 115-b, and a network entity 105, which may be examples of corresponding devices as described herein, including with reference to FIG. 1. For example, the UE 115-a and the UE 115-b may each be examples of the UEs 115 as illustrated by and described with reference to FIG. 1. In some implementations, the UE 115-a, the UE 115-b, and the network entity 105 may support one or more configuration- or signaling-based mechanisms according to which network entity 105 may activate sidelink CA between the UE 115-a (e.g., a first UE 115) and the UE 115-b (e.g., a second UE 115) during, as part of, or in association with a switch from direct communication (via a Uu link 205) between the UE 115-a and the network entity 105 to indirect communication between the UE 115-a and the network entity 105 via the UE 115-b (via a sidelink 210 and a Uu link 215).

In some deployments, various devices may support one or more commercial use cases, such as an NCIS or XR use cases, that may be associated with relatively high throughputs (e.g., Gbit/sec throughputs) and may be relatively latency sensitive (e.g., ~millisecond latencies), in addition to other use cases, such as V2X and public safety use cases. To support such use cases, some devices may employ mechanisms according to which the devices are able to increase spectrum utilization efficiency and reduce latency. One such mechanism may include offloading Uu traffic via sidelink. Further, some devices may support relatively higher frequency sidelink communication, such as mmW (e.g., FR2, FR2x, FR4, etc.) sidelink communication, as such higher frequency sidelink communication may be associated with relatively more available spectrum to satisfy strict throughput and latency constraints.

Additionally, some devices may support sidelink CA at higher frequencies, which may further increase an achievable throughput. For example, CA (which may be an aspect of mmW sidelink) may enable Gbit/sec throughputs by allowing relatively larger bandwidth operation. Other aspects associated with CA may include CC activation/ deactivation, cross-carrier grants and beam-indication, and multi-bit HARQ-ACK. Moreover, some systems may support intra-band/inter-band sidelink CA, with same or different CCs for Uu and sidelink.

In accordance with support for sidelink CA, the UE 115-a, the UE 115-b, and the network entity 105 may support various aspects associated with PC5-RRC, a primary component carrier (PCC), and a secondary component carrier (SCC). For example, a sidelink PC5-RRC connection may be established between a pair of UEs 115 for a respective direction (e.g., from the UE 115-a to the UE 115-b as illustrated by a sidelink 210). In other words, the UE 115-a and the UE 115-b may establish PC5-RRC connections in each direction (e.g., a pair of UEs 115 may establish a PC5-RRC connection in each direction). For sidelink CA, the sidelink 210 may include a PCC and one or more SCCs (e.g., $SCC_1, \ldots, SCC_N$). In some examples, a PCC may be on or associated with a different frequency than an SCC.

A PCC may be defined per transmitting UE 115 per sidelink and a random access channel (RACH) procedure may be performed on the PCC per direction. In some aspects, a beam failure recovery (BFR) procedure on the PCC may include a RACH procedure. Further, radio link management (RLM) and radio link failure (RLF) may be declared on or via the PCC (and not on or via an SCC) per direction. In some aspects, the UE 115-a or the UE 115-b may transmit sidelink control information (SCI) via the PCC (and not via an SCC). Likewise, a physical sidelink control channel (PSCCH) may be carried on or via the PCC. In some aspects, a transmitting UE 115 may broadcast one or more synchronization signal blocks (SSBs) on or via the PCC and a UE 115 may transmit periodic, semi-persistent, or aperiodic SSBs via the PCC based on a power constraint or interference mitigation criterion, or both.

An SCC may be defined per transmitting UE 115 per sidelink. In some aspects, BFR on or associated with an SCC may include a beam change based on measurements. Further, a UE 115 may transmit periodic, semi-persistent, or aperiodic SSBs via an SCC based on a power constraint or interference mitigation criterion, or both.

In some implementations, the UE 115-a, the UE 115-b, and the network entity 105 may support one or more configuration- or signaling-based mechanisms according to which the network entity 105 may activate sidelink CA between the UE 115-a and the UE 115-b during, as part of, or in association with a switch from direct communication between the UE 115-a and the network entity 105 to indirect communication between the UE 115-a and the network entity 105 via the UE 115-b. For example, in accordance with the techniques described herein, the UE 115-a, the UE 115-b, and the network entity 105 may support service continuity for Layer 2 (L2)-based UE-to-network (U2N) relays with intra-network entity (e.g., intra-gNB) DU. Such a U2N relay may be infrastructure-to-device (I2D) or device-to-infrastructure (D2I). The UE 115-a, the UE 115-b, and the network entity 105 may support intra-network entity (e.g., intra-gNB) DU direct to indirect CA path switch when the UE 115-b (e.g., a relay UE 115) is initially in an RRC connected state, an RRC idle state, or another RRC inactive state. In other words, the described techniques support or enable sidelink CA for service continuity when the UE 115-b is in any of an RRC connected state, an RRC idle state, or another RRC inactive state. In some aspects, such a path switch may be associated with an sl-PathSwitchConfig parameter.

For example, the configuration- or signaling-based mechanisms supported by the UE 115-a, the UE 115-b, and the network entity 105 may be associated with (e.g., based on or depend on) whether the UE 115-b (e.g., the relay node) is in an RRC connected state, an RRC idle state, or an RRC inactive state. For example, the UE 115-a, the UE 115-b, and the network entity 105 may employ a first set of one or more configuration- or signaling-based mechanisms if the UE 115-b is in an RRC connected state (as illustrated by and described with reference to FIG. 3), a second set of one or more configuration- or signaling-based mechanisms if the UE 115-b is in an RRC idle state (as illustrated by and described with reference to FIG. 4), and a third set of one or more configuration- or signaling-based mechanisms if the UE 115-b is in an RRC inactive state (as illustrated by and described with reference to FIGS. 5 and 6).

Across such various configuration- or signaling-based mechanisms that the UE 115-a, the UE 115-b, and the network entity 105 may employ, the UE 115-a may receive and measure a first set of one or more SSs transmitted by the UE 115-b via a first CC and a second set of one or more SSs transmitted by the UE 115-b via a second CC. The UE 115-a may transmit a first measurement report associated with the first set of SSs and a second measurement report associated with the second set of SSs and may receive, based on the first and second measurement reports, a first control message (e.g., a reconfiguration message, such as an RRCReconfiguration message) including a set of sidelink CA parameters. The UE 115-a and the UE 115-b may establish a sidelink connection based on the set of sidelink CA parameters (if the sidelink connection has yet to be established) or may reconfigure the sidelink connection based on the set of sidelink CA parameters (if the sidelink connection has already been established). The UE 115-a may transmit a second control message (e.g., a reconfiguration complete message, such as an RRCReconfigurationComplete message) responsive to the first control message indicating that sidelink CA between the UE 115-a and the UE 115-b is complete and, accordingly, may transmit data to, or receive data from, the network entity 105 indirectly via the UE 115-b in accordance with the sidelink CA.

To enable sidelink CA for relay-based service continuity, the measurement configuration at the UE 115-a may include a configuration to measure and report on multiple carriers for a single relay UE 115 (e.g., the UE 115-b). Likewise, the UE 115-b may be configured (e.g., in accordance with pre-loaded information or via signaling from the network entity 105) to transmit one or more SSs on or via multiple carriers. As described herein, an SS may be an example of or may otherwise be referred to as any measurement signal, including an SSB or a channel state information (CSI) reference signal (CSI-RS).

The measurement types performed by the UE 115-a may include Layer 1 (L1)- or Layer 3 (L3)-level measurements, or any combination thereof, per carrier, which may be reported back to the network entity 105. L1 measurements may include, for example, a reference signal receive power (RSRP), a reference signal receive quality (RSRQ), a signal-to-interference-plus-noise ratio (SINR), or a receive signal strength indicator (RSSI), among other examples of signal measurement metrics. In some examples, such a measurement object and reporting configuration (which may be periodic, semi-persistent, or aperiodic) may be defined (e.g., configured via signaling or via pre-loaded information) for sidelink CA. Further, in some implementations, the network entity 105 may perform a decision associated with whether to configure a path switch and enable sidelink CA based on the measurements reported by the UE 115-*a*.

Figure 3:
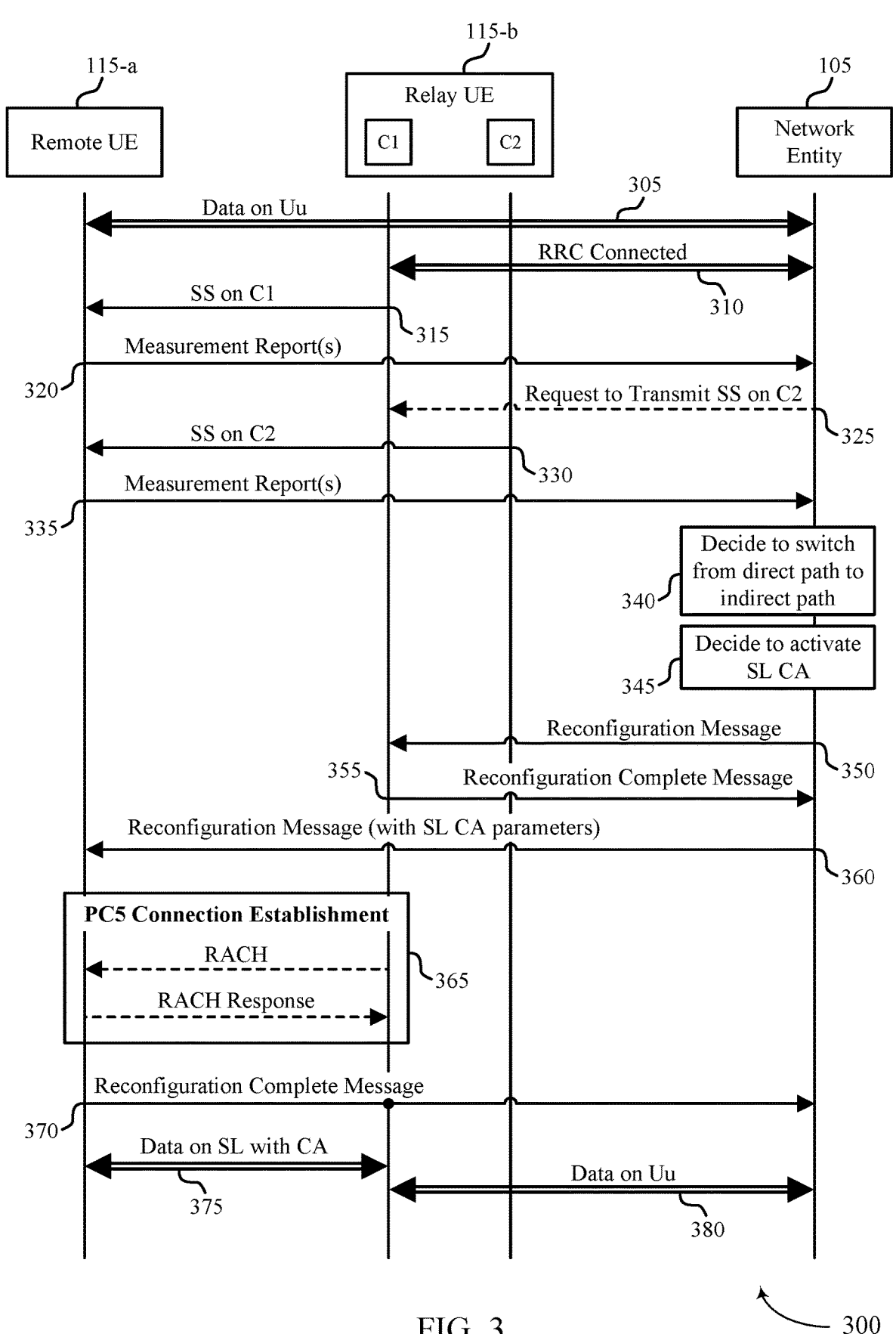
FIGS. 3-6 illustrate examples of process flows that support techniques for activating sidelink CA during a switch from direct to indirect communication in accordance with one or more aspects of the present disclosure.

FIG. 3 illustrates an example of a process flow 300 that supports techniques for activating sidelink CA during a switch from direct to indirect communication in accordance with one or more aspects of the present disclosure. The process flow 300 may implement or be implemented to facilitate or realize aspects of the wireless communications system 100 and the wireless communications system 200. For example, the process flow 300 illustrates communication between the UE 115-*a* (e.g., a remote UE 115), the UE 115-*b* (e.g., a relay UE 115), and the network entity 105, which may be examples of corresponding devices illustrated by and described with reference to FIGS. 1 and 2.

In some implementations, the process flow 300 illustrates an intra-gNB DU direct to indirect path switch when the UE 115-*b* is initially in an RRC connected state. In such implementations, both the UE 115-*a* and the UE 115-*b* may be RRC connected to the network entity 105 (e.g., a serving gNB), sidelink CA capability information of the UE 115-*b* may be available to the network entity 105 (e.g., transmitted via signaling from the UE 115-*b* to the network entity 105), the sidelink CA capability information of the UE 115-*a* may be available or unavailable to the network entity 105, and the UE 115-*a* may be configured (e.g., via signaling or pre-loaded information) to report measurements associated with multiple CCs for relay UEs (e.g., including the UE 115-*b*).

In the following description of the process flow 300, the operations may be performed (such as reported or provided) in a different order than the order shown, or the operations performed by the example devices may be performed in different orders or at different times. Some operations also may be left out of the process flow 300, or other operations may be added to the process flow 300. Further, although some operations or signaling may be shown to occur at different times for discussion purposes, these operations may actually occur at the same time. Additionally, the signaling and messaging illustrated by and described with reference to the process flow 300 may be included in control messages (e.g., RRC messages), data messages, or any combination thereof.

At 305, the UE 115-*a* and the network entity 105 may initially transmit and receive data with each other via a direct Uu link between the UE 115-*a* and the network entity 105, such as the Uu link 205 as illustrated by and described with reference to FIG. 2.

At 310, the UE 115-*b* may initially be in an RRC connected state with the network entity 105.

At 315, the UE 115-*a* may receive, from the UE 115-*b*, a first set of SSs on a first CC (e.g., C1) and may measure the first set of SSs.

At 320, the UE 115-*a* may transmit, to the network entity 105, a first set of one or more measurement reports associated with the first set of SSs.

At 325, the UE 115-*b* may optionally receive, from the network entity 105, a request to transmit one or more SSs on or via a second CC (e.g., C2). For example, the UE 115-*b* may be in an RRC connected mode and transmit SSs on C1 and C2 without receiving a request from the network entity 105 to transmit SSs on C2 or in accordance with a request or demand by the network entity 105. As such, the UE 115-*b* and the network entity may support a decision-making mechanism associated with a tradeoff between additional signaling and latency with additional power saving options at the UE 115-*b* and less signaling and latency with fewer power saving options at the UE 115-*b*.

At 330, the UE 115-*a* may receive, from the UE 115-*b*, a second set of SSs on the second CC and may measure the second set of SSs.

At 335, the UE 115-*a* may transmit, to the network entity 105, a second set of one or more measurement reports associated with the second set of SSs. As such, the measurement reports sent from the UE 115-*a* to the network entity 105 may include multiple CC measurements per relay UE 115.

At 340, the network entity 105 may decide (e.g., determine or select) to switch the UE 115-*a* from a direct communication path between the UE 115-*a* and the network entity 105 to an indirect communication path between the UE 115-*a* and the network entity 105 via the UE 115-*b*. In some implementations, the network entity 105 may perform such a decision based on one or both of the first set of measurement reports associated with the first set of SSs and the second set of measurement reports associated with the second set of SSs.

At 345, the network entity 105 may decide (e.g., determine or select) to activate sidelink CA between the UE 115-*a* and the UE 115-*b*. In some implementations, the network entity 105 may perform such a decision based on both the first set of measurement reports associated with the first set of SSs and the second set of measurement reports associated with the second set of SSs. In other words, the decision to activate sidelink CA between the UE 115-*a* and the UE 115-*b* may be taken at the network entity 105 based on the measurement repots for C1 and C2.

At 350, the UE 115-*b* may receive, from the network entity 105, a reconfiguration message. Such a reconfiguration message may be an RRCReconfiguration message and the network entity 105 may transmit the RRCReconfiguration message as part of a reconfiguration to target U2N relay UE procedure.

At 355, the UE 115-*b* may transmit, to the network entity 105, a reconfiguration complete message. Such a reconfiguration complete message may be an RRCReconfiguration-Complete message and the UE 115-*b* may transmit the RRCReconfigurationComplete message responsive to the RRCReconfiguration message and also as part of the reconfiguration to target U2N relay UE procedure.

At 360, the UE 115-*a* may receive, from the network entity 105, a reconfiguration message including a set of parameters associated with the sidelink CA between the UE 115-*a* and the UE 115-*b*. For example, the RRC reconfiguration message that the UE 115-*a* receives at 360 may include one or more parameters for establishing (e.g., setting up) the sidelink CA between the UE 115-*a* and the UE 115-*b* or an indication for the establishment of the sidelink CA between the UE 115-*a* and the UE 115-*b*, or both. The reconfiguration message may be an RRCReconfiguration message.

At 365, the UE 115-*a* and the UE 115-*b* may establish a sidelink connection (e.g., a PC5 connection) in accordance with a PC5 connection establishment procedure. In the context of the process flow 300, the UE 115 and the UE 115-*b* establish the sidelink connection based on the reconfiguration message including the sidelink CA parameters. In some implementations, establishing the sidelink connection may include the UE 115-*b* transmitting a RACH message to the UE 115-*a* and the UE 115-*a* transmitting a RACH response message to the UE 115-*b*. In some examples, the UE 115-*a* and the UE 115-*b* may perform such a RACH procedure based on a frequency band or range via which the UE 115-*a* and the UE 115-*b* communicate. For example, the UE 115-*a* and the UE 115-*b* may perform a RACH procedure if the UE 115-*a* and the UE 115-*b* communicate via relatively higher frequency bands, such as FR2, FR2x, or FR4 radio frequency bands, and may refrain from performing a RACH procedure otherwise. In other words, the UE 115-*a* and the UE 115-*b* may support, for FR2, FR2x, or FR4, a RACH based SSB associated RACH and response procedure for connection establishment.

At 370, the UE 115-*a* may transmit, to the network entity 105 via the UE 115-*b*, a reconfiguration complete message. The reconfiguration complete message may be an RRCReconfigurationComplete message and the UE 115-*a* may transmit the RRCReconfigurationComplete message responsive to receiving the reconfiguration message at 360. In some implementations, the reconfiguration complete message may indicate a completion of an establishment or activation of the sidelink CA between the UE 115-*a* and the UE 115-*b*.

At 375, the UE 115-*a* may transmit data to, or receive data from, the UE 115-*b* in accordance with the sidelink CA between the UE 115-*a* and the UE 115-*b* and in accordance with the indirect communication between the UE 115-*a* and the network entity 105 via the UE 115-*b*.

At 380, the UE 115-*b* may transmit data to, or receive data from, the network entity 105 in accordance with the indirect communication between the UE 115-*a* and the network entity 105 via the UE 115-*b*. In other words, the UE 115-*b* may relay data between the UE 115-*a* and the network entity 105 based on the establishment and setup of the sidelink connection and the sidelink CA between the UE 115-*a* and the UE 115-*b*.

Figure 4:
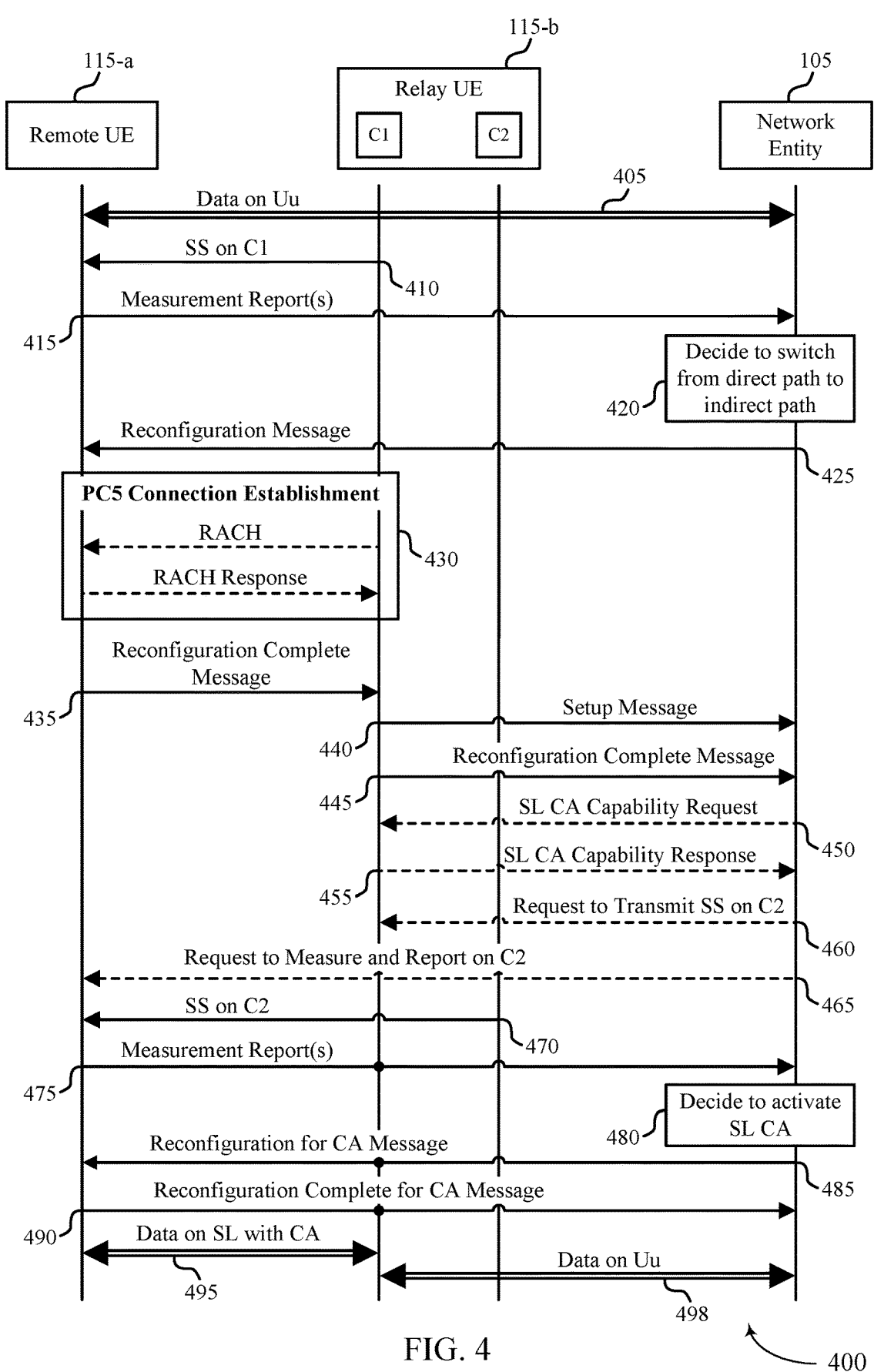

FIG. 4 illustrates an example of a process flow 400 that supports techniques for activating sidelink carrier aggregation during a switch from direct to indirect communication in accordance with one or more aspects of the present disclosure. The process flow 400 may implement or be implemented to facilitate or realize aspects of the wireless communications system 100 and the wireless communications system 200. For example, the process flow 400 illustrates communication between the UE 115-*a* (e.g., a remote UE 115), the UE 115-*b* (e.g., a relay UE 115), and the network entity 105, which may be examples of corresponding devices illustrated by and described with reference to FIGS. 1 and 2.

In some implementations, the process flow 400 illustrates an intra-gNB DU direct to indirect path switch when the UE 115-*b* is initially in an RRC idle state. In such implementations, the UE 115-*a* may be RRC connected to the network entity 105 (e.g., a serving gNB), the UE 115-*b* may be in an RRC idle state on Uu, sidelink CA capability information of the UE 115-*a* may be available at the network entity 105, and sidelink CA capability information of the UE 115-*b* may be unavailable at the network entity 105. Further, the UE 115-*a* may be configured to report measurements with multiple CCs for relay UEs 115 (e.g., including the UE 115-*b*) and the UE 115-*a* and the UE 115-*b* may not be initially connected via sidelink.

In the following description of the process flow 400, the operations may be performed (such as reported or provided) in a different order than the order shown, or the operations performed by the example devices may be performed in different orders or at different times. Some operations also may be left out of the process flow 400, or other operations may be added to the process flow 400. Further, although some operations or signaling may be shown to occur at different times for discussion purposes, these operations may actually occur at the same time. Additionally, the signaling and messaging illustrated by and described with reference to the process flow 400 may be included in control messages (e.g., RRC messages), data messages, or any combination thereof.

At 405, the UE 115-*a* and the network entity 105 may initially transmit and receive data with each other via a direct Uu link between the UE 115-*a* and the network entity 105, such as the Uu link 205 as illustrated by and described with reference to FIG. 2.

At 410, the UE 115-*a* may receive, from the UE 115-*b*, a first set of SSs on a first CC (e.g., C1) and may measure the first set of SSs.

At 415, the UE 115-*a* may transmit, to the network entity 105, a first set of one or more measurement reports associated with the first set of SSs. As such, an initial set of measurement reports provided by the UE 115-*a* may include measurements associated with a single CC. In other words, the initial set of measurement reports provided by the UE 115-*a* may include C1 measurements and exclude C2 measurements.

At 420, the network entity 105 may decide (e.g., determine or select) to switch the UE 115-*a* from a direct communication path between the UE 115-*a* and the network entity 105 to an indirect communication path between the UE 115-*a* and the network entity 105 via the UE 115-*b*. In some implementations, the network entity 105 may perform such a decision based on the first set of measurement reports associated with the first set of SSs.

At 425, the UE 115-*a* may receive, from the network entity 105, a reconfiguration message. Such a reconfiguration message may be an RRCReconfiguration message and may include a set of parameters associated with the switch from the direct communication path to the indirect communication path.

At 430, the UE 115-*a* and the UE 115-*b* may establish a sidelink connection (e.g., a PC5 connection) in accordance with a PC5 connection establishment procedure. In the context of the process flow 400, the UE 115 and the UE 115-*b* establish the sidelink connection based on the reconfiguration message received at 425 (which may not include sidelink CA parameters). In some implementations, establishing the sidelink connection may include the UE 115-*b* transmitting a RACH message to the UE 115-*a* and the UE 115-*a* transmitting a RACH response message to the UE 115-*b*. In some examples, the UE 115-*a* and the UE 115-*b* may perform such a RACH procedure based on a frequency band or range via which the UE 115-*a* and the UE 115-*b* communicate. For example, the UE 115-*a* and the UE 115-*b* may perform a RACH procedure if the UE 115-*a* and the UE 115-*b* communicate via relatively higher frequency bands, such as FR2, FR2x, or FR4 radio frequency bands, and may refrain from performing a RACH procedure otherwise. In other words, the UE 115-*a* and the UE 115-*b* may support, for FR2, FR2x, or FR4, a RACH based SSB associated RACH and response procedure for connection establishment.

At 435, the UE 115-*a* may transmit, to the UE 115-*b*, a reconfiguration complete message. In some examples, the reconfiguration complete message may be an RRCReconfigurationComplete message and may be responsive to the reconfiguration message received from the network entity 105 at 425, but transmitted to the UE 115-*b* (for relaying on to the network entity 105) in accordance with the sidelink connection between the UE 115-a and the UE 115-b already being established. In other words, after the sidelink connection is established, the RRCReconfigurationComplete message may originate from the UE 115-a and may be routed to the network entity 105 via the UE 115-b. Additionally, in some examples, such a reconfiguration complete message may trigger the UE 115-b to establish an RRC connection with the network entity 105.

At 440, for example, the UE 115-b may transmit, to the network entity 105, a setup message. The setup message may be an example of an RRC setup message for the U2N relay UE (e.g., for the UE 115-b). In other words, the UE 115-b may setup the Uu RRC connection between the UE 115-b and the network entity 105 based on receiving the RRCReconfigurationComplete message from the UE 115-a.

At 445, the UE 115-b may route the reconfiguration complete message received from the UE 115-a at 435 to the network entity 105. The reconfiguration complete message may be an RRCReconfigurationComplete message.

At 450, the UE 115-b may receive, from the network entity 105, a sidelink CA capability request. In other words, after the sidelink connection is established, the network entity 105 may request sidelink CA capability information from the UE 115-b. In some aspects, such a sidelink CA capability request may be referred to as a sidelink CA capability inquiry message.

At 455, the UE 115-b may transmit, to the network entity 105, a sidelink CA capability response message including an indication of the sidelink CA capability of the UE 115-b (which may indicate that the UE 115-b is capable of sidelink CA).

At 460, the UE 115-b may receive, from the network entity 105, a request to start transmitting one or more SSs on or via the second CC (e.g., C2).

At 465, the UE 115-a may receive, from the network entity 105, a request to measure and report on the second CC (e.g., C2). In other words, the network entity 105 may request the UE 115-a to perform measurements on C2 and report the measurements back to the network entity 105.

At 470, the UE 115-a may receive, from the UE 115-b, a second set of SSs on the second CC and may measure the second set of SSs (e.g., in accordance with the request received from the network entity 105).

At 475, the UE 115-a may transmit, to the network entity 105 via the UE 115-b, a second set of one or more measurement reports associated with the second set of SSs.

At 480, the network entity 105 may decide (e.g., determine or select) to activate sidelink CA between the UE 115-a and the UE 115-b. In some implementations, the network entity 105 may perform such a decision based on the second set of measurement reports associated with the second set of SSs. In other words, the decision to activate sidelink CA between the UE 115-a and the UE 115-b may be taken at the network entity 105 based on the measurement repots for C2.

At 485, the UE 115-a may receive, from the network entity 105 via the UE 115-b, a reconfiguration for CA message. The reconfiguration for CA message may be an RRCReconfiguration for CA message and may include a set of parameters associated with the sidelink CA between the UE 115-a and the UE 115-b. In other words, based on the C2 measurement report(s), the network entity 105 may decide to activate sidelink CA on the link between the UE 115-a and the UE 115-b and perform an RRC reconfiguration for the sidelink CA, where such an RRC reconfiguration message for the sidelink CA may be sent via the UE 115-b to the UE 115-a. Further, if the UE 115-a and the UE 115-b communicate via FR2, FRx, or FR4, the network entity 105 may additionally perform beam selection for one or both of the UE 115-a and the UE 115-b.

At 490, the UE 115-a may transmit, to the network entity 105 via the UE 115-b, a reconfiguration complete for CA message. The reconfiguration complete for CA message may be an RRCReconfigurationComplete for CA message and the UE 115-a may transmit the RRCReconfigurationComplete for CA message responsive to receiving the reconfiguration for CA message at 485. In some implementations, the reconfiguration complete for CA message may indicate a completion of an establishment or activation of the sidelink CA between the UE 115-a and the UE 115-b. As such, the RRC reconfiguration/complete for sidelink CA messages may include parameters for establishing (e.g., setting up) the sidelink CA and an indication for the establishment of the sidelink CA between the UE 115-a and the UE 115-b.

At 495, the UE 115-a may transmit data to, or receive data from, the UE 115-b in accordance with the sidelink CA between the UE 115-a and the UE 115-b and in accordance with the indirect communication between the UE 115-a and the network entity 105 via the UE 115-b.

At 498, the UE 115-b may transmit data to, or receive data from, the network entity 105 in accordance with the indirect communication between the UE 115-a and the network entity 105 via the UE 115-b. In other words, the UE 115-b may relay data between the UE 115-a and the network entity 105 based on the establishment and setup of the sidelink connection and the sidelink CA between the UE 115-a and the UE 115-b.

Figure 5:
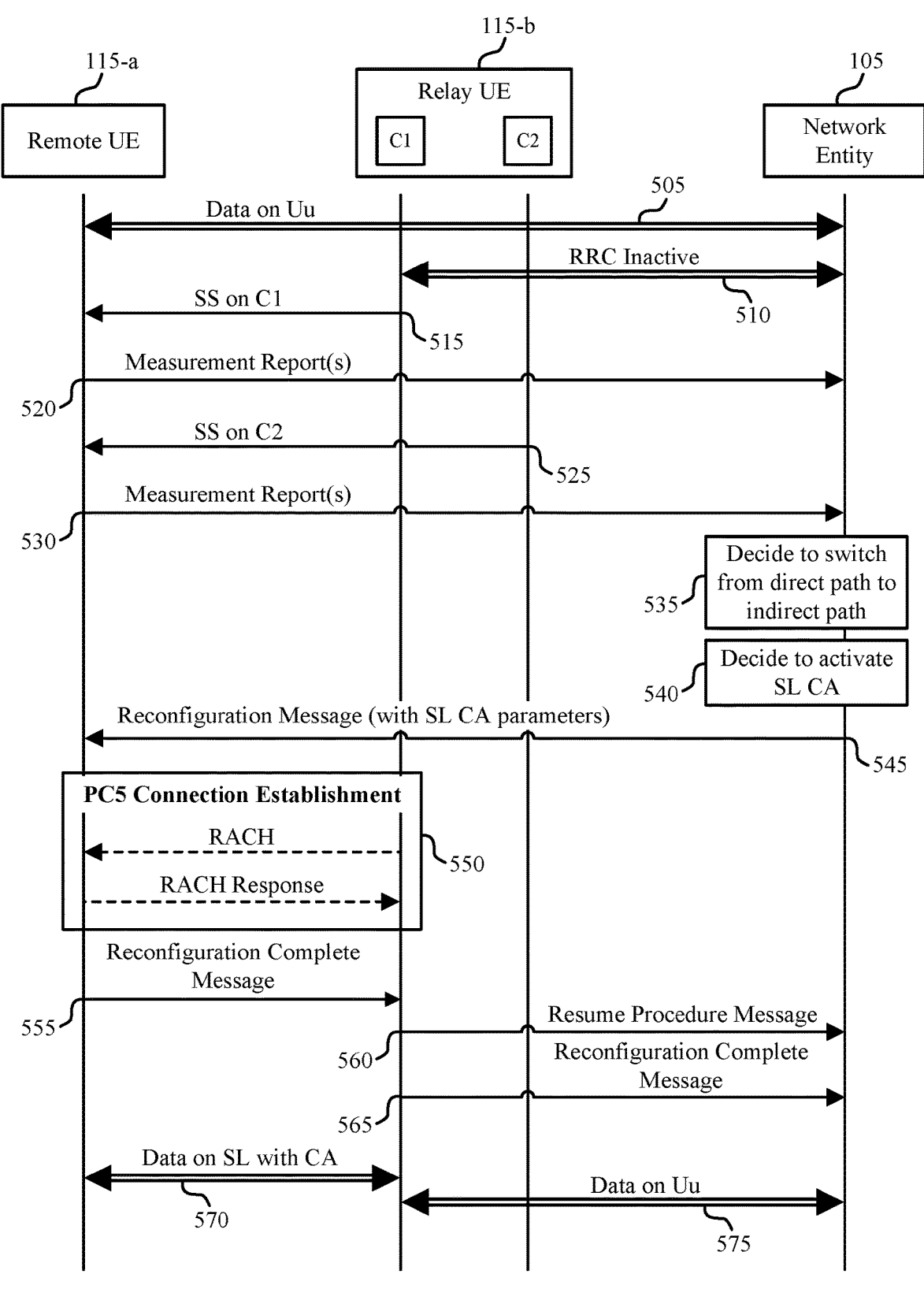

FIG. 5 illustrates an example of a process flow 500 that supports techniques for activating sidelink carrier aggregation during a switch from direct to indirect communication in accordance with one or more aspects of the present disclosure. The process flow 500 may implement or be implemented to facilitate or realize aspects of the wireless communications system 100 and the wireless communications system 200. For example, the process flow 500 illustrates communication between the UE 115-a (e.g., a remote UE 115), the UE 115-b (e.g., a relay UE 115), and the network entity 105, which may be examples of corresponding devices illustrated by and described with reference to FIGS. 1 and 2.

In some implementations, the process flow 500 illustrates an intra-gNB DU direct to indirect path switch when the UE 115-b is initially in an RRC inactive state. In such implementations, the UE 115-a may be RRC connected to the network entity 105 (e.g., a serving gNB) and the UE 115-b may be RRC inactive with respect to the network entity 105. In the example in which the UE 115-b is initially in an RRC inactive state of the process flow 500, sidelink CA capability information of the UE 115-a and the UE 115-b may be available at the network entity 105, the UE 115-a may be configured to report measurements with multiple CCs for relay UEs 115 (e.g., including the UE 115-b), and the network entity 105 may perform one RRC reconfiguration to setup the relay and activate sidelink CA between the UE 115-a and the UE 115-b. Further, in the example in which the UE 115-b is initially in an RRC inactive state of the process flow 500, the UE 115-b may transmit SSs on both the first CC (e.g., C1) and the second CC (e.g., C2) in the RRC inactive mode.

In the following description of the process flow 500, the operations may be performed (such as reported or provided) in a different order than the order shown, or the operations performed by the example devices may be performed in different orders or at different times. Some operations also may be left out of the process flow 500, or other operations may be added to the process flow 500. Further, although some operations or signaling may be shown to occur at different times for discussion purposes, these operations may actually occur at the same time. Additionally, the signaling and messaging illustrated by and described with reference to the process flow 500 may be included in control messages (e.g., RRC messages), data messages, or any combination thereof.

At 505, the UE 115-*a* and the network entity 105 may initially transmit and receive data with each other via a direct Uu link between the UE 115-*a* and the network entity 105, such as the Uu link 205 as illustrated by and described with reference to FIG. 2.

At 510, the UE 115-*b* may initially be in an RRC inactive state with respect to the network entity 105.

At 515, the UE 115-*a* may receive, from the UE 115-*b*, a first set of SSs on a first CC (e.g., C1) and may measure the first set of SSs.

At 520, the UE 115-*a* may transmit, to the network entity 105, a first set of one or more measurement reports associated with the first set of SSs.

At 525, the UE 115-*a* may receive, from the UE 115-*b*, a second set of SSs on the second CC and may measure the second set of SSs.

At 530, the UE 115-*a* may transmit, to the network entity 105, a second set of one or more measurement reports associated with the second set of SSs. As such, the measurement reports sent from the UE 115-*a* to the network entity 105 may include multiple CC measurements per relay UE 115.

At 535, the network entity 105 may decide (e.g., determine or select) to switch the UE 115-*a* from a direct communication path between the UE 115-*a* and the network entity 105 to an indirect communication path between the UE 115-*a* and the network entity 105 via the UE 115-*b*. In some implementations, the network entity 105 may perform such a decision based on one or both of the first set of measurement reports associated with the first set of SSs and the second set of measurement reports associated with the second set of SSs.

At 540, the network entity 105 may decide (e.g., determine or select) to activate sidelink CA between the UE 115-*a* and the UE 115-*b*. In some implementations, the network entity 105 may perform such a decision based on both the first set of measurement reports associated with the first set of SSs and the second set of measurement reports associated with the second set of SSs. In other words, the decision to activate sidelink CA between the UE 115-*a* and the UE 115-*b* may be taken at the network entity 105 based on the measurement repots for C1 and C2. As such, the network entity 105 may decide to switch paths from direct to indirect and activate sidelink CA simultaneously.

At 545, the UE 115-*a* may receive, from the network entity 105, a reconfiguration message including a set of parameters associated with the sidelink CA between the UE 115-*a* and the UE 115-*b*. For example, the RRC reconfiguration message that the UE 115-*a* receives at 545 may include one or more parameters for establishing (e.g., setting up) the sidelink CA between the UE 115-*a* and the UE 115-*b*. The reconfiguration message may be an RRCReconfiguration message.

At 550, the UE 115-*a* and the UE 115-*b* may establish a sidelink connection (e.g., a PC5 connection) in accordance with a PC5 connection establishment procedure. In the context of the process flow 500, the UE 115 and the UE 115-*b* establish the sidelink connection based on the reconfiguration message including the sidelink CA parameters. In some implementations, establishing the sidelink connection may include the UE 115-*b* transmitting a RACH message to the UE 115-*a* and the UE 115-*a* transmitting a RACH response message to the UE 115-*b*. In some examples, the UE 115-*a* and the UE 115-*b* may perform such a RACH procedure based on a frequency band or range via which the UE 115-*a* and the UE 115-*b* communicate. For example, the UE 115-*a* and the UE 115-*b* may perform a RACH procedure if the UE 115-*a* and the UE 115-*b* communicate via relatively higher frequency bands, such as FR2, FR2x, or FR4 radio frequency bands, and may refrain from performing a RACH procedure otherwise. In other words, the UE 115-*a* and the UE 115-*b* may support, for FR2, FR2x, or FR4, a RACH based SSB associated RACH and response procedure for connection establishment.

At 555, the UE 115-*a* may transmit, to the UE 115-*b*, a reconfiguration complete message. In some examples, the reconfiguration complete message may be an RRCReconfigurationComplete message and may be responsive to the reconfiguration message received from the network entity 105 at 545, but transmitted to the UE 115-*b* (for relaying on to the network entity 105) in accordance with the sidelink connection between the UE 115-*a* and the UE 115-*b* already being established. In other words, after the sidelink connection is established, the RRCReconfigurationComplete message may originate from the UE 115-*a* and may be routed to the network entity 105 via the UE 115-*b*. Additionally, in some examples, such a reconfiguration complete message may trigger the UE 115-*b* to resume an RRC connection with the network entity 105 and may include an indication for the establishment of the sidelink CA between the UE 115-*a* and the UE 115-*b*.

At 560, for example, the UE 115-*b* may transmit, to the network entity 105, a resume procedure message. The resume procedure message may be an example of an RRC resume procedure message for the U2N relay UE (e.g., for the UE 115-*b*). In other words, the UE 115-*b* may resume the Uu RRC connection between the UE 115-*b* and the network entity 105 based on receiving the RRCReconfigurationComplete message from the UE 115-*a*.

At 565, the UE 115-*b* may route the reconfiguration complete message received from the UE 115-*a* at 555 to the network entity 105. The reconfiguration complete message may be an RRCReconfigurationComplete message. As such, after the RRC connection between the UE 115-*b* and the network entity 105 is resumed, the UE 115-*b* may route the reconfiguration complete message to the network entity 105, which may mark an end of the direct to indirect procedure.

At 570, the UE 115-*a* may transmit data to, or receive data from, the UE 115-*b* in accordance with the sidelink CA between the UE 115-*a* and the UE 115-*b* and in accordance with the indirect communication between the UE 115-*a* and the network entity 105 via the UE 115-*b*.

At 575, the UE 115-*b* may transmit data to, or receive data from, the network entity 105 in accordance with the indirect communication between the UE 115-*a* and the network entity 105 via the UE 115-*b*. In other words, the UE 115-*b* may relay data between the UE 115-*a* and the network entity 105 based on the establishment and setup of the sidelink connection and the sidelink CA between the UE 115-*a* and the UE 115-*b*.

Figure 6:
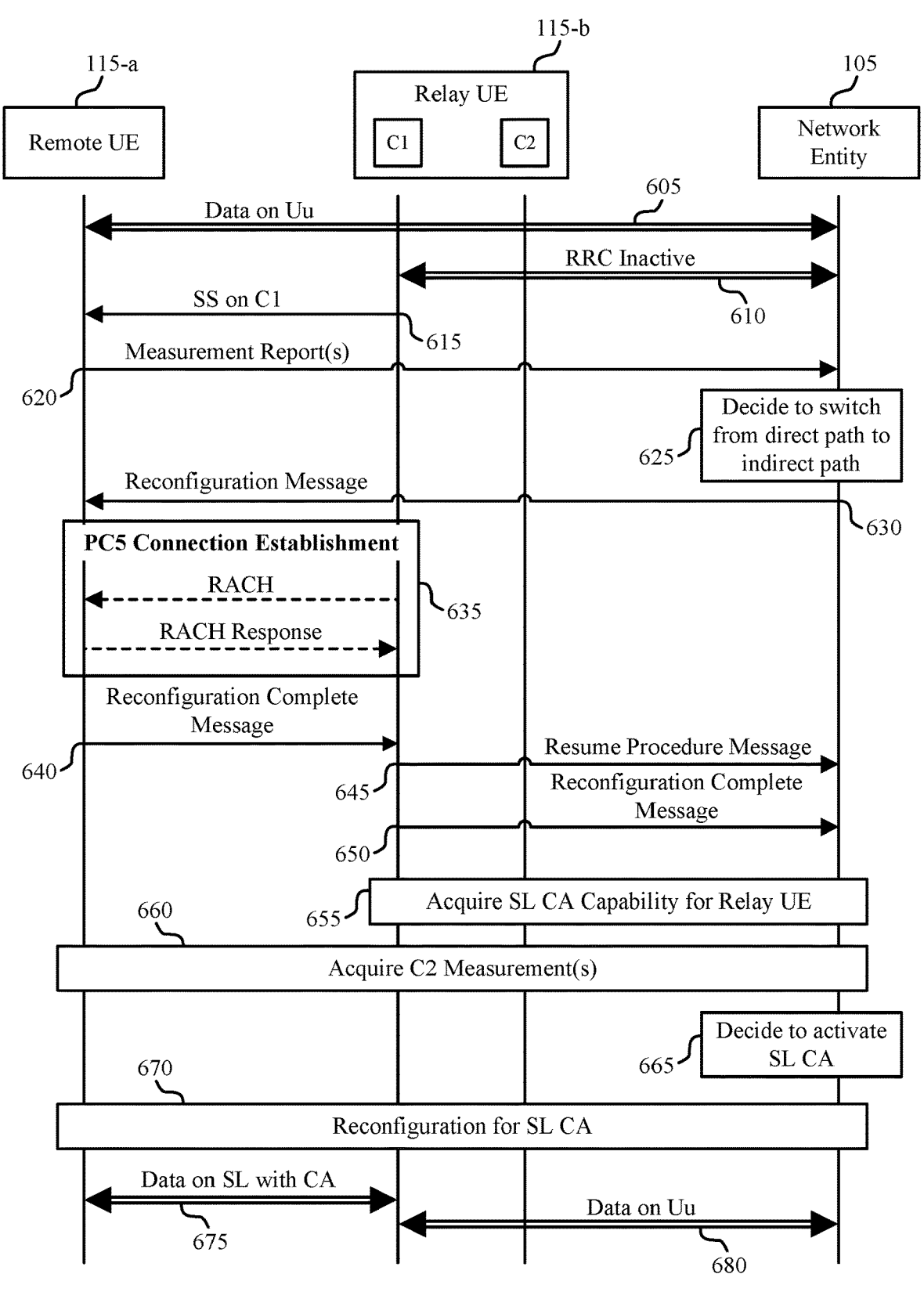

FIG. 6 illustrates an example of a process flow 600 that supports techniques for activating sidelink carrier aggregation during a switch from direct to indirect communication in accordance with one or more aspects of the present disclosure. The process flow 600 may implement or be implemented to facilitate or realize aspects of the wireless communications system 100 and the wireless communications system 200. For example, the process flow 600 illustrates communication between the UE 115-*a* (e.g., a remote UE 115), the UE 115-*b* (e.g., a relay UE 115), and the network entity 105, which may be examples of corresponding devices illustrated by and described with reference to FIGS. 1 and 2.

In some implementations, the process flow 600 illustrates an intra-gNB DU direct to indirect path switch when the UE 115-*b* is initially in an RRC inactive state. In such implementations, the UE 115-*a* may be RRC connected to the network entity 105 (e.g., a serving gNB) and the UE 115-*b* may be RRC inactive with respect to the network entity 105. In the example in which the UE 115-*b* is initially in an RRC inactive state of the process flow 600, sidelink CA capability information of the UE 115-*a* and the UE 115-*b* may be available at the network entity 105, the UE 115-*a* may be configured to report measurements with multiple CCs for relay UEs 115 (e.g., including the UE 115-*b*), and the network entity 105 may transmit multiple RRC reconfiguration messages to setup the relay and activate sidelink CA between the UE 115-*a* and the UE 115-*b*. Further, in the example in which the UE 115-*b* is initially in an RRC inactive state of the process flow 600, the UE 115-*b* may transmit one or more SSs on the first CC (e.g., C1), and not on the second CC (e.g., C2), in the RRC inactive mode.

In the following description of the process flow 600, the operations may be performed (such as reported or provided) in a different order than the order shown, or the operations performed by the example devices may be performed in different orders or at different times. Some operations also may be left out of the process flow 600, or other operations may be added to the process flow 600. Further, although some operations or signaling may be shown to occur at different times for discussion purposes, these operations may actually occur at the same time. Additionally, the signaling and messaging illustrated by and described with reference to the process flow 600 may be included in control messages (e.g., RRC messages), data messages, or any combination thereof.

At 605, the UE 115-*a* and the network entity 105 may initially transmit and receive data with each other via a direct Uu link between the UE 115-*a* and the network entity 105, such as the Uu link 205 as illustrated by and described with reference to FIG. 2.

At 610, the UE 115-*b* may initially be in an RRC inactive state with respect to the network entity 105.

At 615, the UE 115-*a* may receive, from the UE 115-*b*, a first set of SSs on a first CC (e.g., C1) and may measure the first set of SSs.

At 620, the UE 115-*a* may transmit, to the network entity 105, a first set of one or more measurement reports associated with the first set of SSs. As such, an initial set of measurement reports provided by the UE 115-*a* may include measurements associated with a single CC. In other words, the initial set of measurement reports provided by the UE 115-*a* may include C1 measurements and exclude C2 measurements.

At 625, the network entity 105 may decide (e.g., determine or select) to switch the UE 115-*a* from a direct communication path between the UE 115-*a* and the network entity 105 to an indirect communication path between the UE 115-*a* and the network entity 105 via the UE 115-*b*. In some implementations, the network entity 105 may perform such a decision based on the first set of measurement reports associated with the first set of SSs.

At 630, the UE 115-*a* may receive, from the network entity 105, a reconfiguration message. Such a reconfiguration message may be an RRCReconfiguration message and may include a set of parameters associated with the switch from the direct communication path to the indirect communication path.

At 635, the UE 115-*a* and the UE 115-*b* may establish a sidelink connection (e.g., a PC5 connection) in accordance with a PC5 connection establishment procedure. In the context of the process flow 600, the UE 115 and the UE 115-*b* establish the sidelink connection based on the reconfiguration message received at 630 (which may not include sidelink CA parameters). In some implementations, establishing the sidelink connection may include the UE 115-*b* transmitting a RACH message to the UE 115-*a* and the UE 115-*a* transmitting a RACH response message to the UE 115-*b*. In some examples, the UE 115-*a* and the UE 115-*b* may perform such a RACH procedure based on a frequency band or range via which the UE 115-*a* and the UE 115-*b* communicate. For example, the UE 115-*a* and the UE 115-*b* may perform a RACH procedure if the UE 115-*a* and the UE 115-*b* communicate via relatively higher frequency bands, such as FR2, FR2x, or FR4 radio frequency bands, and may refrain from performing a RACH procedure otherwise. In other words, the UE 115-*a* and the UE 115-*b* may support, for FR2, FR2x, or FR4, a RACH based SSB associated RACH and response procedure for connection establishment.

At 640, the UE 115-*a* may transmit, to the UE 115-*b*, a reconfiguration complete message. In some examples, the reconfiguration complete message may be an RRCReconfigurationComplete message and may be responsive to the reconfiguration message received from the network entity 105 at 545, but transmitted to the UE 115-*b* (for relaying on to the network entity 105) in accordance with the sidelink connection between the UE 115-*a* and the UE 115-*b* already being established. In other words, after the sidelink connection is established, the RRCReconfigurationComplete message may originate from the UE 115-*a* and may be routed to the network entity 105 via the UE 115-*b*. Additionally, in some examples, such a reconfiguration complete message may trigger the UE 115-*b* to resume an RRC connection with the network entity 105 and may include an indication for the establishment of the sidelink CA between the UE 115-*a* and the UE 115-*b*.

At 645, for example, the UE 115-*b* may transmit, to the network entity 105, a resume procedure message. The resume procedure message may be an example of an RRC resume procedure message for the U2N relay UE (e.g., for the UE 115-*b*). In other words, the UE 115-*b* may resume the Uu RRC connection between the UE 115-*b* and the network entity 105 based on receiving the RRCReconfigurationComplete message from the UE 115-*a*.

At 650, the UE 115-*b* may route (e.g., transmit or relay) the reconfiguration complete message received from the UE 115-*a* at 555 to the network entity 105. The reconfiguration complete message may be an RRCReconfigurationComplete message. As such, after the RRC connection between the UE 115-*b* and the network entity 105 is resumed, the UE 115-*b* may route the reconfiguration complete message to the network entity 105.

At 655, the network entity 105 may acquire sidelink CA capability information for the UE 115-*b*. In some examples, such an acquiring of sidelink CA capability information performed at 655 may include steps similar to those described with reference to steps 450 and 455 of FIG. 4.

At 660, the network entity 105 may acquire a second set of measurement reports associated with a second set of SSs transmitted by the UE 115-b via a second CC (e.g., C2). In some examples, such an acquiring of the second set of measurement reports performed at 660 may include steps similar to those described with reference to steps 460, 465, 470, and 475 of FIG. 4. As such, after the sidelink connection between the UE 115-a and the UE 115-b is established, the network entity 105 may acquire the sidelink CA capability for the UE 115-b and measurements on C2 are sent by the UE 115-a to the network entity 105.

At 665, the network entity 105 may decide (e.g., determine or select) to activate sidelink CA between the UE 115-a and the UE 115-b. In some implementations, the network entity 105 may perform such a decision based on the second set of measurement reports associated with the second set of SSs. In other words, the decision to activate sidelink CA between the UE 115-a and the UE 115-b may be taken at the network entity 105 based on the measurement repots for C2.

At 670, the UE 115-a, the UE 115-b, and the network entity 105 may perform a reconfiguration for sidelink CA. In some examples, such a performing of a reconfiguration for sidelink CA may include steps similar to those described with reference to steps 485 and 490 of FIG. 4. As such, based on the C2 measurements, the network entity 105 may decide to activate sidelink CA on the link between the UE 115-a and the UE 115-b and the network entity 105 may perform an RRC reconfiguration for sidelink CA.

At 675, the UE 115-a may transmit data to, or receive data from, the UE 115-b in accordance with the sidelink CA between the UE 115-a and the UE 115-b and in accordance with the indirect communication between the UE 115-a and the network entity 105 via the UE 115-b.

At 680, the UE 115-b may transmit data to, or receive data from, the network entity 105 in accordance with the indirect communication between the UE 115-a and the network entity 105 via the UE 115-b. In other words, the UE 115-b may relay data between the UE 115-a and the network entity 105 based on the establishment and setup of the sidelink connection and the sidelink CA between the UE 115-a and the UE 115-b.

Figure 7:
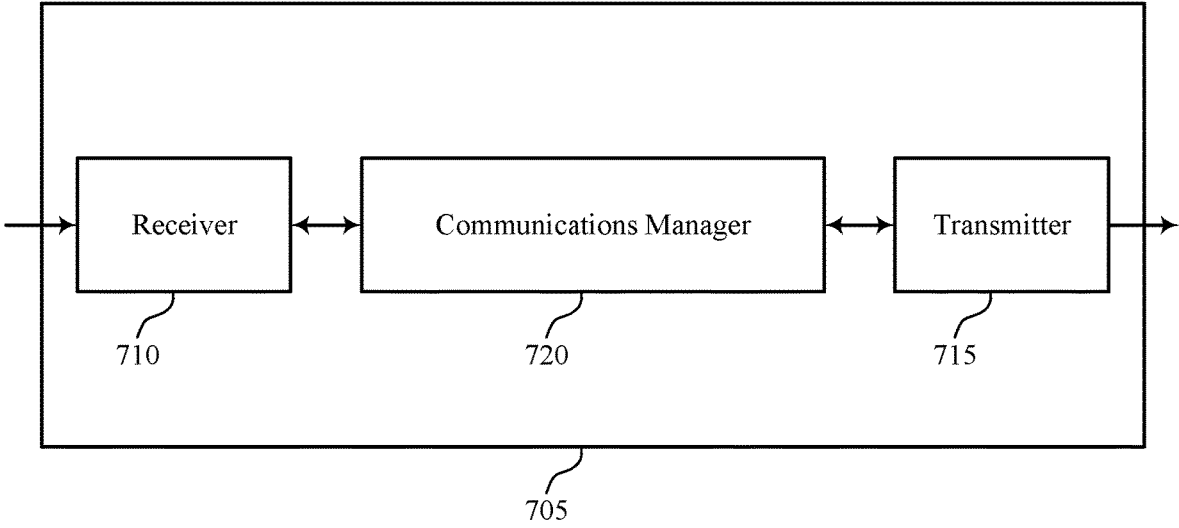
FIGS. 7 and 8 illustrate block diagrams of devices that support techniques for activating sidelink CA during a switch from direct to indirect communication in accordance with one or more aspects of the present disclosure.

FIG. 7 illustrates a block diagram 700 of a device 705 that supports techniques for activating sidelink CA during a switch from direct to indirect communication in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for activating sidelink CA during a switch from direct to indirect communication). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for activating sidelink CA during a switch from direct to indirect communication). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for activating sidelink CA during a switch from direct to indirect communication as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first UE in accordance with examples as disclosed herein. For example, the communications manager 720 may be configured as or otherwise support a means for receiving, from a second UE, a first set of one or more SSs via a first CC and a second set of one or more SSs via a second CC. The communications manager 720 may be configured as or otherwise support a means for transmitting a first measurement report associated with the first set of one or more SSs and a second measurement report associated with the second set of one or more SSs. The communications manager 720 may be configured as or otherwise support a means for receiving a control message associated with indirect communication between the first UE and a network entity via the second UE, where the control message includes a set of parameters associated with a sidelink CA between the first UE and the second UE based on the first measurement report and the second measurement report.

Additionally, or alternatively, the communications manager 720 may support wireless communication in accordance with examples as disclosed herein. For example, the communications manager 720 may be configured as or otherwise support a means for transmitting a first set of one or more SSs via a first CC and a second set of one or more SSs via a second CC. The communications manager 720 may be configured as or otherwise support a means for establishing a sidelink connection between a first UE and a second UE in accordance with a switch from direct communication between the first UE and a network entity to indirect communication between the first UE and the network entity via the second UE. The communications manager 720 may be configured as or otherwise support a means for transmitting data to, or receiving data from, the first UE in accordance with the indirect communication between the first UE and the network entity via the second UE and a sidelink CA between the first UE and the second UE.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and more efficient utilization of communication resources.

Figure 8:
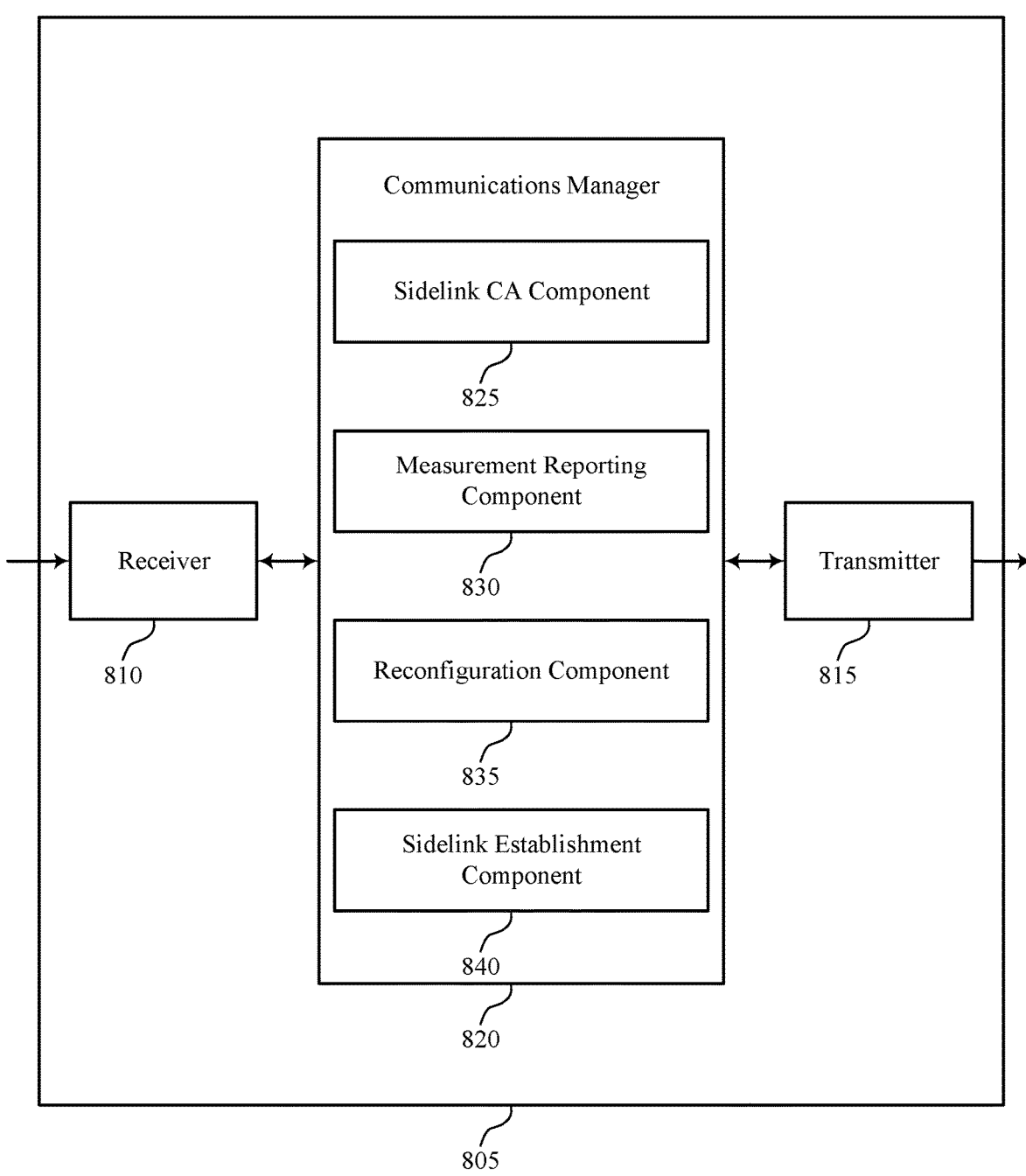

FIG. 8 illustrates a block diagram 800 of a device 805 that supports techniques for activating sidelink CA during a switch from direct to indirect communication in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for activating sidelink CA during a switch from direct to indirect communication). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for activating sidelink CA during a switch from direct to indirect communication). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for activating sidelink CA during a switch from direct to indirect communication as described herein. For example, the communications manager 820 may include a sidelink CA component 825, a measurement reporting component 830, a reconfiguration component 835, a sidelink establishment component 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first UE in accordance with examples as disclosed herein. The sidelink CA component 825 may be configured as or otherwise support a means for receiving, from a second UE, a first set of one or more SSs via a first CC and a second set of one or more SSs via a second CC. The measurement reporting component 830 may be configured as or otherwise support a means for transmitting a first measurement report associated with the first set of one or more SSs and a second measurement report associated with the second set of one or more SSs. The reconfiguration component 835 may be configured as or otherwise support a means for receiving a control message associated with indirect communication between the first UE and a network entity via the second UE, where the control message includes a set of parameters associated with a sidelink CA between the first UE and the second UE based on the first measurement report and the second measurement report.

Additionally, or alternatively, the communications manager 820 may support wireless communication in accordance with examples as disclosed herein. The sidelink CA component 825 may be configured as or otherwise support a means for transmitting a first set of one or more SSs via a first CC and a second set of one or more SSs via a second CC. The sidelink establishment component 840 may be configured as or otherwise support a means for establishing a sidelink connection between a first UE and a second UE in accordance with a switch from direct communication between the first UE and a network entity to indirect communication between the first UE and the network entity via the second UE. The sidelink CA component 825 may be configured as or otherwise support a means for transmitting data to, or receiving data from, the first UE in accordance with the indirect communication between the first UE and the network entity via the second UE and a sidelink CA between the first UE and the second UE.

Figure 9:
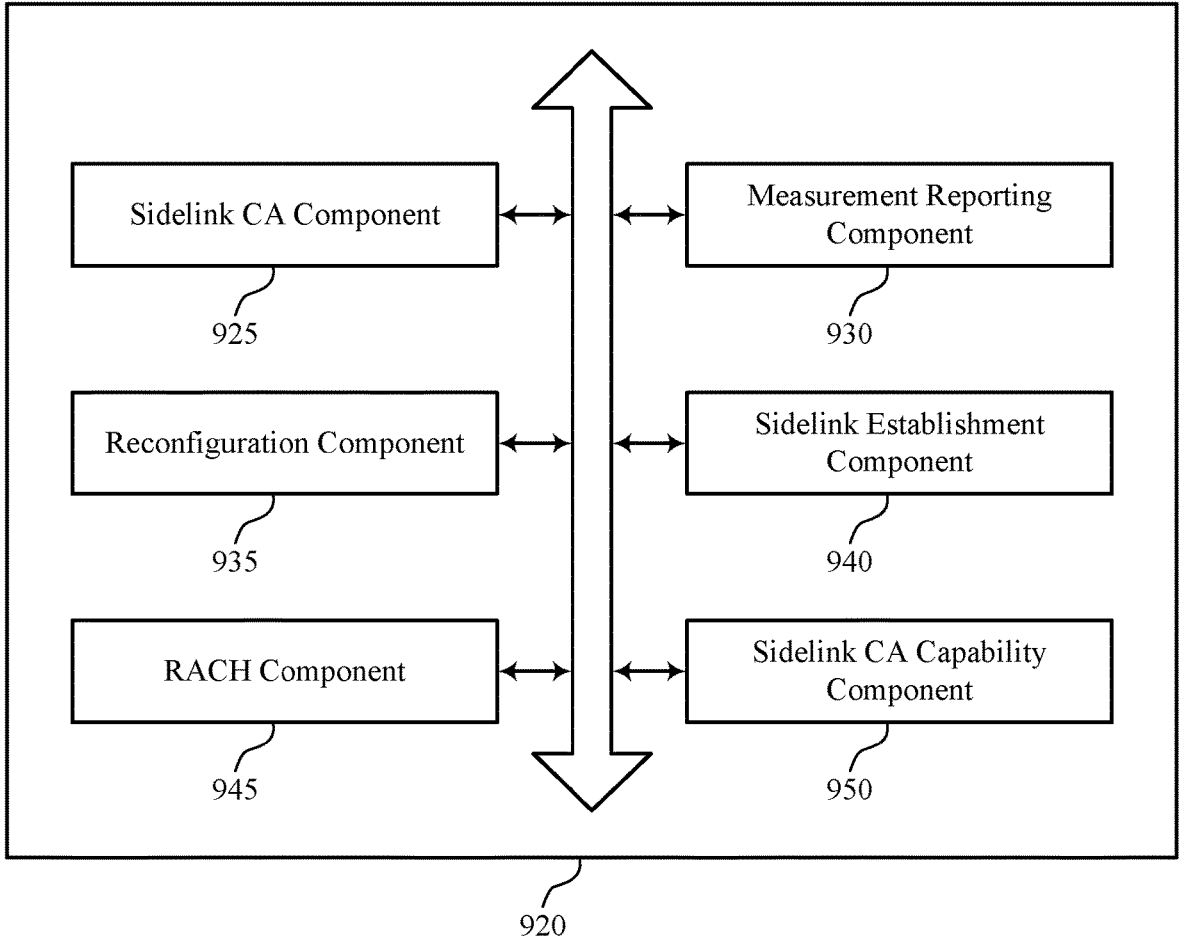
FIG. 9 illustrates a block diagram of a communications manager that supports techniques for activating sidelink CA during a switch from direct to indirect communication in accordance with one or more aspects of the present disclosure.

FIG. 9 illustrates a block diagram 900 of a communications manager 920 that supports techniques for activating sidelink CA during a switch from direct to indirect communication in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for activating sidelink CA during a switch from direct to indirect communication as described herein. For example, the communications manager 920 may include a sidelink CA component 925, a measurement reporting component 930, a reconfiguration component 935, a sidelink establishment component 940, a RACH component 945, a sidelink CA capability component 950, or any combination thereof. Each of these components may communicate, directly or indirectly, with one another (e.g., via one or more buses).

The communications manager 920 may support wireless communication at a first UE in accordance with examples as disclosed herein. The sidelink CA component 925 may be configured as or otherwise support a means for receiving, from a second UE, a first set of one or more SSs via a first CC and a second set of one or more SSs via a second CC. The measurement reporting component 930 may be configured as or otherwise support a means for transmitting a first measurement report associated with the first set of one or more SSs and a second measurement report associated with the second set of one or more SSs. The reconfiguration component 935 may be configured as or otherwise support a means for receiving a control message associated with indirect communication between the first UE and a network entity via the second UE, where the control message includes a set of parameters associated with a sidelink CA between the first UE and the second UE based on the first measurement report and the second measurement report.

In some examples, the sidelink establishment component 940 may be configured as or otherwise support a means for establishing a sidelink connection between the first UE and the second UE based on the control message, where the control message further includes a second set of parameters associated with a switch from direct communication between the first UE and the network entity to the indirect communication between the first UE and the network entity via the second UE.

In some examples, the reconfiguration component 935 may be configured as or otherwise support a means for receiving a second control message associated with a switch from direct communication between the first UE and the network entity to the indirect communication between the first UE and the network entity via the second UE, where the second control message includes a second set of parameters associated with the switch. In some examples, the sidelink establishment component 940 may be configured as or otherwise support a means for establishing a sidelink connection between the first UE and the second UE based on the second control message.

In some examples, the measurement reporting component 930 may be configured as or otherwise support a means for receiving, from the network entity, a request to measure the second set of one or more SSs via the second CC and to transmit the second measurement report, where receiving the second set of one or more SSs and transmitting the second measurement report is based on receiving the request.

In some examples, the reconfiguration component 935 may be configured as or otherwise support a means for transmitting a second control message responsive to the control message, where the second control message indicates a completion of a sidelink connection between the first UE and the second UE in accordance with the sidelink CA.

In some examples, the RACH component 945 may be configured as or otherwise support a means for receiving, from the second UE and in accordance with a sidelink connection establishment procedure, a random access channel message based on a radio frequency band of a sidelink connection between the first UE and the second UE. In some examples, the RACH component 945 may be configured as or otherwise support a means for transmitting, to the second UE, a random access channel response message based on receiving the random access channel message.

In some examples, the sidelink CA component 925 may be configured as or otherwise support a means for transmitting data to, or receiving data from, the network entity via the second UE in accordance with the indirect communication between the first UE and the network entity via the second UE and the sidelink CA between the first UE and the second UE.

Additionally, or alternatively, the communications manager 920 may support wireless communication in accordance with examples as disclosed herein. In some examples, the sidelink CA component 925 may be configured as or otherwise support a means for transmitting a first set of one or more SSs via a first CC and a second set of one or more SSs via a second CC. The sidelink establishment component 940 may be configured as or otherwise support a means for establishing a sidelink connection between a first UE and a second UE in accordance with a switch from direct communication between the first UE and a network entity to indirect communication between the first UE and the network entity via the second UE. In some examples, the sidelink CA component 925 may be configured as or otherwise support a means for transmitting data to, or receiving data from, the first UE in accordance with the indirect communication between the first UE and the network entity via the second UE and a sidelink CA between the first UE and the second UE.

In some examples, the sidelink CA component 925 may be configured as or otherwise support a means for receiving, from the network entity, a request to transmit the second set of one or more SSs via the second CC, where transmitting the second set of one or more SSs via the second CC is based on receiving the request.

In some examples, the sidelink CA capability component 950 may be configured as or otherwise support a means for receiving, from the network entity, a sidelink CA capability inquiry message. In some examples, the sidelink CA capability component 950 may be configured as or otherwise support a means for transmitting, to the network entity in response to the sidelink CA capability inquiry message, an indication of a sidelink CA capability of the second UE, where receiving the request to transmit the second set of one or more SSs via the second CC is based on transmitting the indication of the sidelink CA capability of the second UE.

In some examples, the measurement reporting component 930 may be configured as or otherwise support a means for receiving, from the first UE, a measurement report associated with the second set of one or more SSs. In some examples, the measurement reporting component 930 may be configured as or otherwise support a means for transmitting, to the network entity, the measurement report received from the first UE.

In some examples, the reconfiguration component 935 may be configured as or otherwise support a means for receiving, from the first UE, a control message that indicates a completion of the sidelink connection between the first UE and the second UE in accordance with the sidelink CA. In some examples, the reconfiguration component 935 may be configured as or otherwise support a means for transmitting, to the network entity, the control message received from the first UE.

In some examples, the RACH component 945 may be configured as or otherwise support a means for transmitting, to the first UE and in accordance with a sidelink connection establishment procedure, a random access channel message based on a radio frequency band of a sidelink connection between the first UE and the second UE. In some examples, the RACH component 945 may be configured as or otherwise support a means for receiving, from the first UE, a random access channel response message based on transmitting the random access channel message.

In some examples, establishing the sidelink connection between the first UE and the second UE is based on the first set of one or more SSs or is based on both the first set of one or more SSs and the second set of one or more SSs.

In some examples, the sidelink CA is based on the first set of one or more SSs and the second set of one or more SSs.

Figure 10:
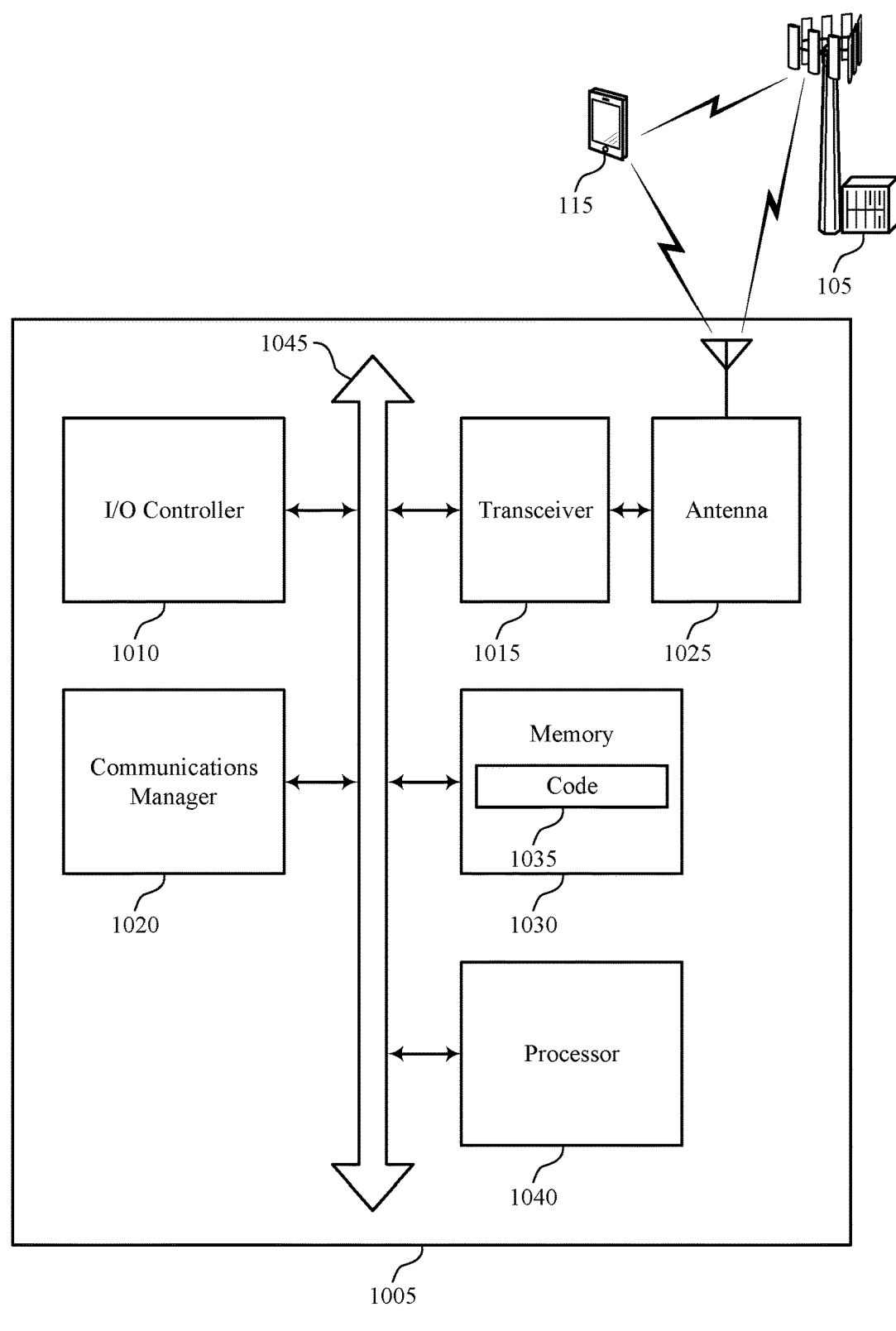
FIG. 10 illustrates a diagram of a system including a device that supports techniques for activating sidelink CA during a switch from direct to indirect communication in accordance with one or more aspects of the present disclosure.

FIG. 10 illustrates a diagram of a system 1000 including a device 1005 that supports techniques for activating side-link CA during a switch from direct to indirect communication in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for activating sidelink CA during a switch from direct to indirect communication). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a first UE in accordance with examples as disclosed herein. For example, the communications manager 1020 may be configured as or otherwise support a means for receiving, from a second UE, a first set of one or more SSs via a first CC and a second set of one or more SSs via a second CC. The communications manager 1020 may be configured as or otherwise support a means for transmitting a first measurement report associated with the first set of one or more SSs and a second measurement report associated with the second set of one or more SSs. The communications manager 1020 may be configured as or otherwise support a means for receiving a control message associated with indirect communication between the first UE and a network entity via the second UE, where the control message includes a set of parameters associated with a sidelink CA between the first UE and the second UE based on the first measurement report and the second measurement report.

Additionally, or alternatively, the communications manager 1020 may support wireless communication in accordance with examples as disclosed herein. For example, the communications manager 1020 may be configured as or otherwise support a means for transmitting a first set of one or more SSs via a first CC and a second set of one or more SSs via a second CC. The communications manager 1020 may be configured as or otherwise support a means for establishing a sidelink connection between a first UE and a second UE in accordance with a switch from direct communication between the first UE and a network entity to indirect communication between the first UE and the network entity via the second UE. The communications manager 1020 may be configured as or otherwise support a means for transmitting data to, or receiving data from, the first UE in accordance with the indirect communication between the first UE and the network entity via the second UE and a sidelink CA between the first UE and the second UE.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for activating sidelink CA during a switch from direct to indirect communication as described herein, or the processor 1040 and the memory 1030 may be otherwise configured to perform or support such operations.

Figure 11:
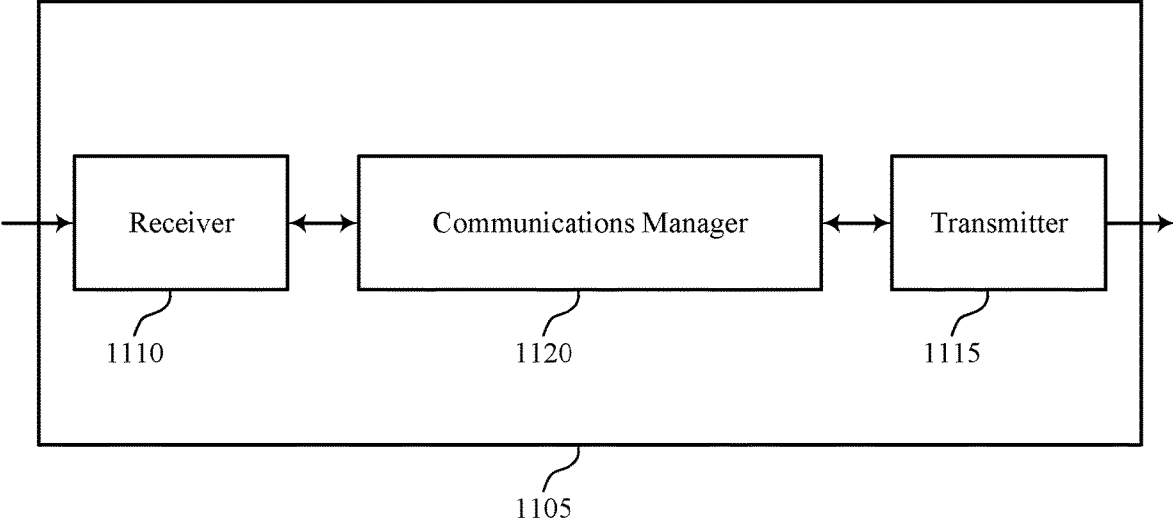
FIGS. 11 and 12 illustrate block diagrams of devices that support techniques for activating sidelink CA during a switch from direct to indirect communication in accordance with one or more aspects of the present disclosure.

FIG. 11 illustrates a block diagram 1100 of a device 1105 that supports techniques for activating sidelink CA during a switch from direct to indirect communication in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of techniques for activating sidelink CA during a switch from direct to indirect communication as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. For example, the communications manager 1120 may be configured as or otherwise support a means for receiving, from a first UE, a first measurement report associated with a first set of one or more SSs transmitted by a second UE via a first CC and a second measurement report associated with a second set of one or more SSs transmitted by the second UE via a second CC. The communications manager 1120 may be configured as or otherwise support a means for transmitting a first control message associated with indirect communication between the first UE and the network entity via the second UE, where the first control message includes a set of parameters associated with a sidelink CA between the first UE and the second UE based on the first measurement report and the second measurement report. The communications manager 1120 may be configured as or otherwise support a means for receiving a second control message responsive to the first control message, where the second control message indicates a completion of a sidelink connection between the first UE and the second UE in accordance with the sidelink CA.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, and more efficient utilization of communication resources.

Figure 12:
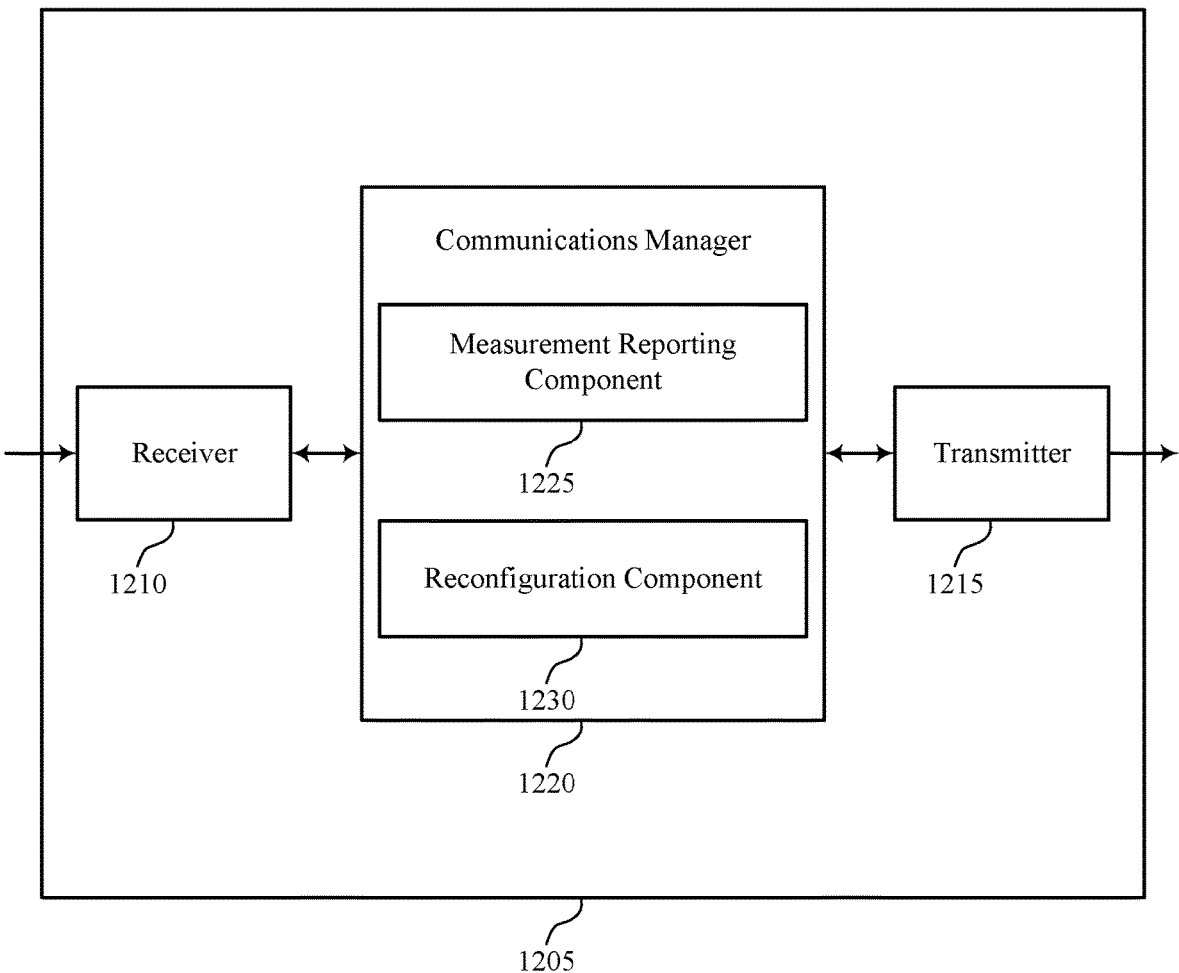

FIG. 12 illustrates a block diagram 1200 of a device 1205 that supports techniques for activating sidelink CA during a switch from direct to indirect communication in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of techniques for activating sidelink CA during a switch from direct to indirect communication as described herein. For example, the communications manager 1220 may include a measurement reporting component 1225 a reconfiguration component 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver

1210, the transmitter 1215, or both to obtain information, output information, or perform various other operations as described herein.

The communications manager 1220 may support wireless communication at a network entity in accordance with examples as disclosed herein. The measurement reporting component 1225 may be configured as or otherwise support a means for receiving, from a first UE, a first measurement report associated with a first set of one or more SSs transmitted by a second UE via a first CC and a second measurement report associated with a second set of one or more SSs transmitted by the second UE via a second CC. The reconfiguration component 1230 may be configured as or otherwise support a means for transmitting a first control message associated with indirect communication between the first UE and the network entity via the second UE, where the first control message includes a set of parameters associated with a sidelink CA between the first UE and the second UE based on the first measurement report and the second measurement report. The reconfiguration component 1230 may be configured as or otherwise support a means for receiving a second control message responsive to the first control message, where the second control message indicates a completion of a sidelink connection between the first UE and the second UE in accordance with the sidelink CA.

Figure 13:
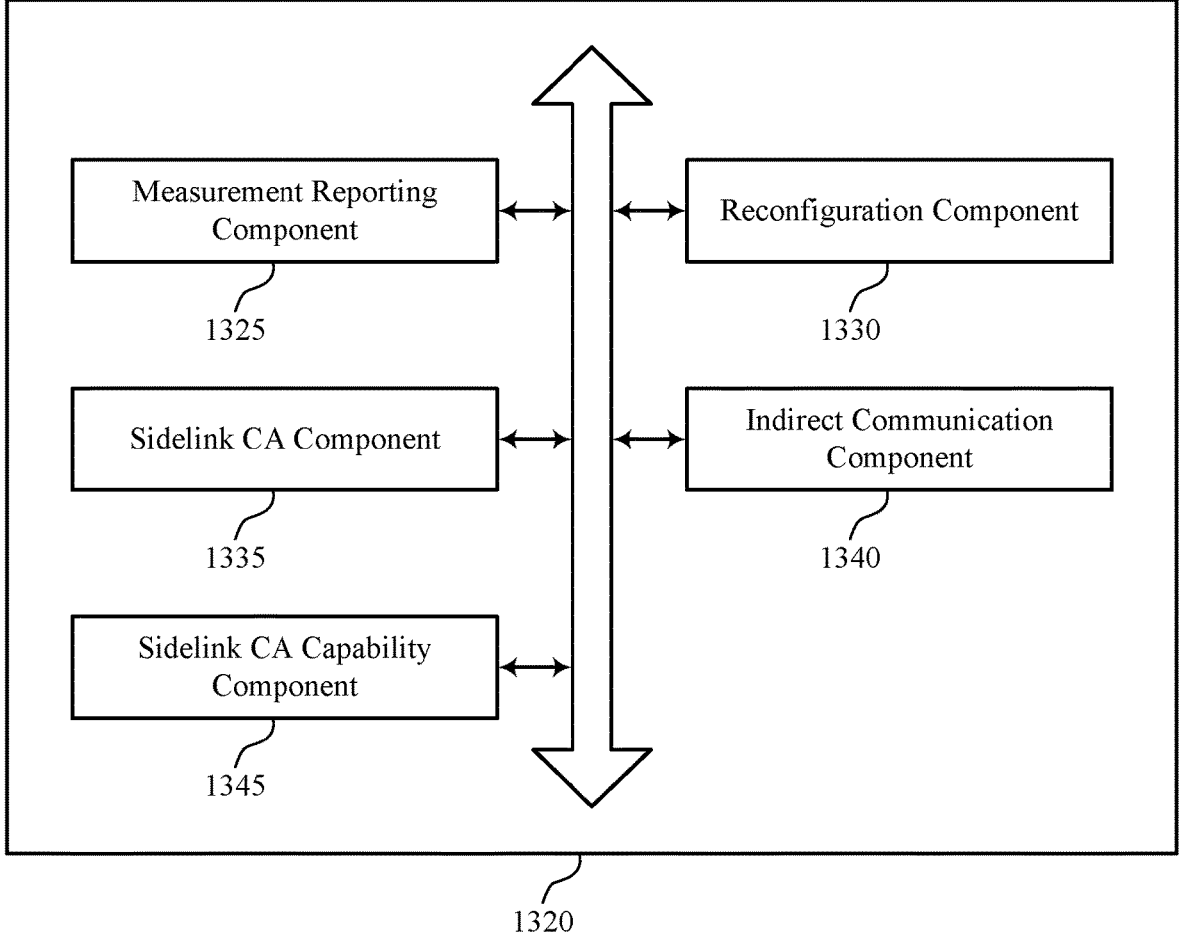
FIG. 13 illustrates a block diagram of a communications manager that supports techniques for activating sidelink CA during a switch from direct to indirect communication in accordance with one or more aspects of the present disclosure.

FIG. 13 illustrates a block diagram 1300 of a communications manager 1320 that supports techniques for activating sidelink CA during a switch from direct to indirect communication in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for activating sidelink CA during a switch from direct to indirect communication as described herein. For example, the communications manager 1320 may include a measurement reporting component 1325, a reconfiguration component 1330, a sidelink CA component 1335, an indirect communication component 1340, a sidelink CA capability component 1345, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity in accordance with examples as disclosed herein. The measurement reporting component 1325 may be configured as or otherwise support a means for receiving, from a first UE, a first measurement report associated with a first set of one or more SSs transmitted by a second UE via a first CC and a second measurement report associated with a second set of one or more SSs transmitted by the second UE via a second CC. The reconfiguration component 1330 may be configured as or otherwise support a means for transmitting a first control message associated with indirect communication between the first UE and the network entity via the second UE, where the first control message includes a set of parameters associated with a sidelink CA between the first UE and the second UE based on the first measurement report and the second measurement report. In some examples, the reconfiguration component 1330 may be configured as or otherwise support a means for receiving a second control message responsive to the first control message, where the second control message indicates a completion of a sidelink connection between the first UE and the second UE in accordance with the sidelink CA.

In some examples, the sidelink CA component 1335 may be configured as or otherwise support a means for transmitting, to the second UE, a request to transmit the second set of one or more SSs via the second CC, where receiving the second measurement report is based on transmitting the request.

In some examples, the sidelink CA capability component 1345 may be configured as or otherwise support a means for transmitting, to the second UE, a sidelink CA capability inquiry message. In some examples, the sidelink CA capability component 1345 may be configured as or otherwise support a means for receiving, from the second UE in response to the sidelink CA capability inquiry message, an indication of a sidelink CA capability of the second UE, where transmitting the request to transmit the second set of one or more SSs via the second CC is based on receiving the indication of the sidelink CA capability of the second UE.

In some examples, the measurement reporting component 1325 may be configured as or otherwise support a means for transmitting, to the first UE, a request to measure the second set of one or more SSs via the second CC and to transmit the second measurement report, where receiving the second measurement report is based on transmitting the request.

In some examples, the first control message further includes a second set of parameters associated with a switch from direct communication between the first UE and the network entity to the indirect communication between the first UE and the network entity via the second UE. In some examples, transmitting the first control message is based on both the first measurement report and the second measurement report.

In some examples, the reconfiguration component 1330 may be configured as or otherwise support a means for transmitting, to the first UE, a third control message associated with a switch from direct communication between the first UE and the network entity to the indirect communication between the first UE and the network entity via the second UE, where the third control message includes a second set of parameters associated with the switch.

In some examples, the third control message is transmitted prior to the first control message. In some examples, transmitting the third control message is based on the first measurement report. In some examples, transmitting the first control message is based on the second measurement report.

In some examples, the indirect communication component 1340 may be configured as or otherwise support a means for transmitting data to, or receiving data from, the second UE in accordance with the indirect communication between the first UE and the network entity via the second UE and the sidelink CA between the first UE and the second UE.

Figure 14:
FIG. 14 illustrates a diagram of a system including a device that supports techniques for activating sidelink CA during a switch from direct to indirect communication in accordance with one or more aspects of the present disclosure.

FIG. 14 illustrates a diagram of a system 1400 including a device 1405 that supports techniques for activating sidelink CA during a switch from direct to indirect communication in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof.

In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting techniques for activating sidelink CA during a switch from direct to indirect communication). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425).

In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for receiving, from a first UE, a first measurement report associated with a first set of one or more SSs transmitted by a second UE via a first CC and a second measurement report associated with a second set of one or more SSs transmitted by the second UE via a second CC. The communications manager 1420 may be configured as or otherwise support a means for transmitting a first control message associated with indirect communication between the first UE and the network entity via the second UE, where the first control message includes a set of parameters associated with a sidelink CA between the first UE and the second UE based on the first measurement report and the second measurement report. The communications manager 1420 may be configured as or otherwise support a means for receiving a second control message responsive to the first control message, where the second control message indicates a completion of a sidelink connection between the first UE and the second UE in accordance with the sidelink CA.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of techniques for activating sidelink CA during a switch from direct to indirect communication as described herein, or the processor 1435 and the memory 1425 may be otherwise configured to perform or support such operations.

FIG. 15 illustrates a flowchart showing a method 1500 that supports techniques for activating sidelink CA during a switch from direct to indirect communication in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, from a second UE, a first set of one or more SSs via a first CC and a second set of one or more SSs via a second CC. The operations of 1505 may be performed in accordance with examples as disclosed herein. In some examples, aspects of the operations of 1505 may be performed by a sidelink CA component 925 as described with reference to FIG. 9.

At 1510, the method may include transmitting a first measurement report associated with the first set of one or more SSs and a second measurement report associated with the second set of one or more SSs. The operations of 1510 may be performed in accordance with examples as disclosed herein. In some examples, aspects of the operations of 1510 may be performed by a measurement reporting component 930 as described with reference to FIG. 9.

At 1515, the method may include receiving a control message associated with indirect communication between the first UE and a network entity via the second UE, where the control message includes a set of parameters associated with a sidelink CA between the first UE and the second UE based on the first measurement report and the second measurement report. The operations of 1515 may be performed in accordance with examples as disclosed herein. In some examples, aspects of the operations of 1515 may be performed by a reconfiguration component 935 as described with reference to FIG. 9.

FIG. 16 illustrates a flowchart showing a method 1600 that supports techniques for activating sidelink CA during a switch from direct to indirect communication in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include transmitting a first set of one or more SSs via a first CC and a second set of one or more SSs via a second CC. The operations of 1605 may be performed in accordance with examples as disclosed herein. In some examples, aspects of the operations of 1605 may be performed by a sidelink CA component 925 as described with reference to FIG. 9.

At 1610, the method may include establishing a sidelink connection between a first UE and a second UE in accordance with a switch from direct communication between the first UE and a network entity to indirect communication between the first UE and the network entity via the second UE. The operations of 1610 may be performed in accordance with examples as disclosed herein. In some examples, aspects of the operations of 1610 may be performed by a sidelink establishment component 940 as described with reference to FIG. 9.

At 1615, the method may include transmitting data to, or receiving data from, the first UE in accordance with the indirect communication between the first UE and the network entity via the second UE and a sidelink CA between the first UE and the second UE. The operations of 1615 may be performed in accordance with examples as disclosed herein. In some examples, aspects of the operations of 1615 may be performed by a sidelink CA component 925 as described with reference to FIG. 9.

FIG. 17 illustrates a flowchart showing a method 1700 that supports techniques for activating sidelink CA during a switch from direct to indirect communication in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include receiving, from a first UE, a first measurement report associated with a first set of one or more SSs transmitted by a second UE via a first CC and a second measurement report associated with a second set of one or more SSs transmitted by the second UE via a second CC. The operations of 1705 may be performed in accordance with examples as disclosed herein. In some examples, aspects of the operations of 1705 may be performed by a measurement reporting component 1325 as described with reference to FIG. 13.

At 1710, the method may include transmitting a first control message associated with indirect communication between the first UE and the network entity via the second UE, where the first control message includes a set of parameters associated with a sidelink CA between the first UE and the second UE based on the first measurement report and the second measurement report. The operations of 1710 may be performed in accordance with examples as disclosed herein. In some examples, aspects of the operations of 1710 may be performed by a reconfiguration component 1330 as described with reference to FIG. 13.

At 1715, the method may include receiving a second control message responsive to the first control message, where the second control message indicates a completion of a sidelink connection between the first UE and the second UE in accordance with the sidelink CA. The operations of 1715 may be performed in accordance with examples as disclosed herein. In some examples, aspects of the operations of 1715 may be performed by a reconfiguration component 1330 as described with reference to FIG. 13.

The following provides an overview of aspects of the present disclosure:

Aspect 1: A method for wireless communication at a first UE, comprising: receiving, from a second UE, a first set of one or more SSs via a first CC and a second set of one or more SSs via a second CC; transmitting a first measurement report associated with the first set of one or more SSs and a second measurement report associated with the second set of one or more SSs; and receiving a control message associated with indirect communication between the first UE and a network entity via the second UE, wherein the control message includes a set of parameters associated with a sidelink CA between the first UE and the second UE based at least in part on the first measurement report and the second measurement report.

Aspect 2: The method of aspect 1, further comprising: establishing a sidelink connection between the first UE and the second UE based at least in part on the control message, wherein the control message further includes a second set of parameters associated with a switch from direct communication between the first UE and the network entity to the indirect communication between the first UE and the network entity via the second UE.

Aspect 3: The method of aspect 1, further comprising: receiving a second control message associated with a switch from direct communication between the first UE and the network entity to the indirect communication between the first UE and the network entity via the second UE, wherein the second control message includes a second set of parameters associated with the switch; and establishing a sidelink connection between the first UE and the second UE based at least in part on the second control message.

Aspect 4: The method of any of aspects 1 through 3, further comprising: receiving, from the network entity, a request to measure the second set of one or more SSs via the second CC and to transmit the second measurement report, wherein receiving the second set of one or more SSs and transmitting the second measurement report is based at least in part on receiving the request.

Aspect 5: The method of any of aspects 1 through 4, further comprising: transmitting a second control message responsive to the control message, wherein the second control message indicates a completion of a sidelink connection between the first UE and the second UE in accordance with the sidelink CA.

Aspect 6: The method of any of aspects 1 through 5, further comprising: receiving, from the second UE and in accordance with a sidelink connection establishment procedure, a random access channel message based at least in part on a radio frequency band of a sidelink connection between the first UE and the second UE; and transmitting, to the second UE, a random access channel response message based at least in part on receiving the random access channel message.

Aspect 7: The method of any of aspects 1 through 6, further comprising: transmitting data to, or receiving data from, the network entity via the second UE in accordance with the indirect communication between the first UE and the network entity via the second UE and the sidelink CA between the first UE and the second UE.

Aspect 8: A method for wireless communication, comprising: transmitting a first set of one or more SSs via a first CC and a second set of one or more SSs via a second CC; establishing a sidelink connection between a first UE and a second UE in accordance with a switch from direct communication between the first UE and a network entity to indirect communication between the first UE and the network entity via the second UE; and transmitting data to, or receiving data from, the first UE in accordance with the indirect communication between the first UE and the network entity via the second UE and a sidelink CA between the first UE and the second UE.

Aspect 9: The method of aspect 8, further comprising: receiving, from the network entity, a request to transmit the second set of one or more SSs via the second CC, wherein transmitting the second set of one or more SSs via the second CC is based at least in part on receiving the request.

Aspect 10: The method of aspect 9, further comprising: receiving, from the network entity, a sidelink CA capability inquiry message; and transmitting, to the network entity in response to the sidelink CA capability inquiry message, an indication of a sidelink CA capability of the second UE, wherein receiving the request to transmit the second set of one or more SSs via the second CC is based at least in part on transmitting the indication of the sidelink CA capability of the second UE.

Aspect 11: The method of any of aspects 8 through 10, further comprising: receiving, from the first UE, a measurement report associated with the second set of one or more SSs; and transmitting, to the network entity, the measurement report received from the first UE.

Aspect 12: The method of any of aspects 8 through 11, further comprising: receiving, from the first UE, a control message that indicates a completion of the sidelink connection between the first UE and the second UE in accordance with the sidelink CA; and transmitting, to the network entity, the control message received from the first UE.

Aspect 13: The method of any of aspects 8 through 12, further comprising: transmitting, to the first UE and in accordance with a sidelink connection establishment procedure, a random access channel message based at least in part on a radio frequency band of a sidelink connection between the first UE and the second UE; and receiving, from the first UE, a random access channel response message based at least in part on transmitting the random access channel message.

Aspect 14: The method of any of aspects 8 through 13, wherein establishing the sidelink connection between the first UE and the second UE is based at least in part on the first set of one or more SSs or is based at least in part on both the first set of one or more SSs and the second set of one or more SSs.

Aspect 15: The method of any of aspects 8 through 14, wherein the sidelink CA is based at least in part on the first set of one or more SSs and the second set of one or more SSs.

Aspect 16: A method for wireless communication at a network entity, comprising: receiving, from a first UE, a first measurement report associated with a first set of one or more SSs transmitted by a second UE via a first CC and a second measurement report associated with a second set of one or more SSs transmitted by the second UE via a second CC; transmitting a first control message associated with indirect communication between the first UE and the network entity via the second UE, wherein the first control message includes a set of parameters associated with a sidelink CA between the first UE and the second UE based at least in part on the first measurement report and the second measurement report; and receiving a second control message responsive to the first control message, wherein the second control message indicates a completion of a sidelink connection between the first UE and the second UE in accordance with the sidelink CA.

Aspect 17: The method of aspect 16, further comprising: transmitting, to the second UE, a request to transmit the second set of one or more SSs via the second CC, wherein receiving the second measurement report is based at least in part on transmitting the request.

Aspect 18: The method of aspect 17, further comprising: transmitting, to the second UE, a sidelink CA capability inquiry message; and receiving, from the second UE in response to the sidelink CA capability inquiry message, an indication of a sidelink CA capability of the second UE, wherein transmitting the request to transmit the second set of one or more SSs via the second CC is based at least in part on receiving the indication of the sidelink CA capability of the second UE.

Aspect 19: The method of any of aspects 16 through 18, further comprising: transmitting, to the first UE, a request to measure the second set of one or more SSs via the second CC and to transmit the second measurement report, wherein receiving the second measurement report is based at least in part on transmitting the request.

Aspect 20: The method of any of aspects 16 through 19, wherein the first control message further includes a second set of parameters associated with a switch from direct communication between the first UE and the network entity to the indirect communication between the first UE and the network entity via the second UE, and transmitting the first control message is based at least in part on both the first measurement report and the second measurement report.

Aspect 21: The method of any of aspects 16 through 19, further comprising: transmitting, to the first UE, a third control message associated with a switch from direct communication between the first UE and the network entity to the indirect communication between the first UE and the network entity via the second UE, wherein the third control message includes a second set of parameters associated with the switch.

Aspect 22: The method of aspect 21, wherein the third control message is transmitted prior to the first control message, transmitting the third control message is based at least in part on the first measurement report, and transmitting the first control message is based at least in part on the second measurement report.

Aspect 23: The method of any of aspects 16 through 22, further comprising: transmitting data to, or receiving data from, the second UE in accordance with the indirect communication between the first UE and the network entity via the second UE and the sidelink CA between the first UE and the second UE.

Aspect 24: An apparatus for wireless communication at a first UE, comprising a processor; memory coupled with the processor; and instructions stored in the memory and executable by the processor to cause the apparatus to perform a method of any of aspects 1 through 7.

Aspect 25: An apparatus for wireless communication at a first UE, comprising at least one means for performing a method of any of aspects 1 through 7.

Aspect 26: A non-transitory computer-readable medium storing code for wireless communication at a first UE, the code comprising instructions executable by a processor to perform a method of any of aspects 1 through 7.

Aspect 27: An apparatus for wireless communication, comprising a processor; memory coupled with the processor; and instructions stored in the memory and executable by the processor to cause the apparatus to perform a method of any of aspects 8 through 15.

Aspect 28: An apparatus for wireless communication, comprising at least one means for performing a method of any of aspects 8 through 15.

Aspect 29: A non-transitory computer-readable medium storing code for wireless communication, the code comprising instructions executable by a processor to perform a method of any of aspects 8 through 15.

Aspect 30: An apparatus for wireless communication at a network entity, comprising a processor; memory coupled with the processor; and instructions stored in the memory and executable by the processor to cause the apparatus to perform a method of any of aspects 16 through 23.

Aspect 31: An apparatus for wireless communication at a network entity, comprising at least one means for performing a method of any of aspects 16 through 23.

Aspect 32: A non-transitory computer-readable medium storing code for wireless communication at a network entity, the code comprising instructions executable by a processor to perform a method of any of aspects 16 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
   at least one processor; and
   at least one memory coupled with the at least one processor, the at least one memory storing instructions executable by the at least one processor to cause the apparatus to:
      receive, from a second UE, a first set of one or more synchronization signals via a first component carrier and a second set of one or more synchronization signals via a second component carrier;
      transmit a first measurement report indicative of one or more first measurements on the first set of one or more synchronization signals and a second measurement report indicative of one or more second measurements on the second set of one or more synchronization signals; and
      receive a control message associated with indirect communication between the first UE and a network entity via the second UE, wherein the control message includes a set of parameters for activating sidelink carrier aggregation between the first UE and the second UE based at least in part on the one or more first measurements indicated by the first measurement report and the one or more second measurements indicated by the second measurement report, wherein the sidelink carrier aggregation is activated based at least in part on a switch from direct communication between the first UE and the network entity to the indirect communication between the first UE and the network entity.

2. The apparatus of claim 1, wherein the instructions are further executable by the at least one processor to cause the apparatus to:
   establish a sidelink connection between the first UE and the second UE based at least in part on the control message, wherein the control message further includes a second set of parameters associated with the switch from the direct communication between the first UE and the network entity to the indirect communication between the first UE and the network entity via the second UE.

3. The apparatus of claim 1, wherein the instructions are further executable by the at least one processor to cause the apparatus to:

receive a second control message associated with the switch from the direct communication between the first UE and the network entity to the indirect communication between the first UE and the network entity via the second UE, wherein the second control message includes a second set of parameters associated with the switch; and establish a sidelink connection between the first UE and the second UE based at least in part on the second control message.

4. The apparatus of claim 1, wherein the instructions are further executable by the at least one processor to cause the apparatus to:

receive, from the network entity, a request to measure the second set of one or more synchronization signals via the second component carrier and to transmit the second measurement report, wherein receiving the second set of one or more synchronization signals and transmitting the second measurement report is based at least in part on receiving the request.

5. The apparatus of claim 1, wherein the instructions are further executable by the at least one processor to cause the apparatus to:

transmit a second control message responsive to the control message, wherein the second control message indicates a completion of a sidelink connection between the first UE and the second UE and indicates the activation of the sidelink carrier aggregation for the sidelink connection.

6. The apparatus of claim 1, wherein the instructions are further executable by the at least one processor to cause the apparatus to:

receive, from the second UE and in accordance with a sidelink connection establishment procedure, a random access channel message based at least in part on a radio frequency band of a sidelink connection between the first UE and the second UE; and transmit, to the second UE, a random access channel response message based at least in part on receiving the random access channel message.

7. The apparatus of claim 1, wherein the instructions are further executable by the at least one processor to cause the apparatus to:

transmit data to, or receive data from, the network entity via the second UE in accordance with the indirect communication between the first UE and the network entity via the second UE and the sidelink carrier aggregation between the first UE and the second UE.

8. An apparatus for wireless communication at a first user equipment (UE), comprising:

at least one processor; and at least one memory coupled with the at least one processor, the at least one memory storing instructions executable by the at least one processor to cause the apparatus to:

transmit, to a second UE, a first set of one or more synchronization signals via a first component carrier and a second set of one or more synchronization signals via a second component carrier;

establish a sidelink connection between the first UE and the second UE in accordance with a switch from direct communication between the second UE and a network entity to indirect communication between the second UE and the network entity via the first UE;

receive, from the second UE, a measurement report indicative of one or more measurements on the second set of one or more synchronization signals; and transmit data to, or receive data from, the second UE in accordance with the indirect communication between the second UE and the network entity via the first UE and a sidelink carrier aggregation between the first UE and the second UE, wherein the sidelink carrier aggregation is:

based at least in part on the first set of one or more synchronization signals and on the one or more measurements of the second set of one or more synchronization signals indicated by the measurement report, and activated based at least in part on the switch from the direct communication between the second UE and the network entity to indirect communication between the second UE and the network entity via the first UE.

9. The apparatus of claim 8, wherein the instructions are further executable by the at least one processor to cause the apparatus to:

receive, from the network entity, a request to transmit the second set of one or more synchronization signals via the second component carrier, wherein transmitting the second set of one or more synchronization signals via the second component carrier is based at least in part on receiving the request.

10. The apparatus of claim 9, wherein the instructions are further executable by the at least one processor to cause the apparatus to:

receive, from the network entity, a sidelink carrier aggregation capability inquiry message; and transmit, to the network entity in response to the sidelink carrier aggregation capability inquiry message, an indication of a sidelink carrier aggregation capability of the first UE, wherein receiving the request to transmit the second set of one or more synchronization signals via the second component carrier is based at least in part on transmitting the indication of the sidelink carrier aggregation capability of the first UE.

11. The apparatus of claim 8, wherein the instructions are further executable by the at least one processor to cause the apparatus to:

transmit, to the network entity, the measurement report received from the first UE.

12. The apparatus of claim 8, wherein the instructions are further executable by the at least one processor to cause the apparatus to:

receive, from the second UE, a control message that indicates a completion of the sidelink connection between the first UE and the second UE in accordance with the sidelink carrier aggregation; and transmit, to the network entity, the control message received from the second UE.

13. The apparatus of claim 8, wherein the instructions are further executable by the at least one processor to cause the apparatus to:

transmit, to the second UE and in accordance with a sidelink connection establishment procedure, a random access channel message based at least in part on a radio frequency band of the sidelink connection between the first UE and the second UE; and receive, from the second UE, a random access channel response message based at least in part on transmitting the random access channel message.

14. The apparatus of claim 8, wherein establishing the sidelink connection between the first UE and the second UE is based at least in part on the first set of one or more synchronization signals or is based at least in part on both the first set of one or more synchronization signals and the second set of one or more synchronization signals.

15. An apparatus for wireless communication at a network entity, comprising:

at least one processor; and at least one memory coupled with the at least one processor, the at least one memory storing instructions executable by the at least one processor to cause the apparatus to:

receive, from a first user equipment (UE), a first measurement report indicative of one or more first measurements on a first set of one or more synchronization signals transmitted by a second UE via a first component carrier and a second measurement report indicative of one or more second measurements on a second set of one or more synchronization signals transmitted by the second UE via a second component carrier;

transmit a first control message associated with indirect communication between the first UE and the network entity via the second UE, wherein the first control message includes a set of parameters for activating sidelink carrier aggregation between the first UE and the second UE based at least in part on the one or more first measurements indicated by the first measurement report and the one or more second measurements indicated by the second measurement report, wherein the sidelink carrier aggregation is activated based at least in part on a switch from direct communication between the first UE and the network entity to the indirect communication between the first UE and the network entity; and receive a second control message responsive to the first control message, wherein the second control message indicates a completion of a sidelink connection between the first UE and the second UE in accordance with the sidelink carrier aggregation.

16. The apparatus of claim 15, wherein the instructions are further executable by the at least one processor to cause the apparatus to:

transmit, to the second UE, a request to transmit the second set of one or more synchronization signals via the second component carrier, wherein receiving the second measurement report is based at least in part on transmitting the request.

17. The apparatus of claim 16, wherein the instructions are further executable by the at least one processor to cause the apparatus to:

transmit, to the second UE, a sidelink carrier aggregation capability inquiry message; and receive, from the second UE in response to the sidelink carrier aggregation capability inquiry message, an indication of a sidelink carrier aggregation capability of the second UE, wherein transmitting the request to transmit the second set of one or more synchronization signals via the second component carrier is based at least in part on receiving the indication of the sidelink carrier aggregation capability of the second UE.

18. The apparatus of claim 15, wherein the instructions are further executable by the at least one processor to cause the apparatus to:

transmit, to the first UE, a request to measure the second set of one or more synchronization signals via the second component carrier and to transmit the second measurement report, wherein receiving the second measurement report is based at least in part on transmitting the request.

19. The apparatus of claim 15, wherein the first control message further includes a second set of parameters associated with the switch from the direct communication between the first UE and the network entity to the indirect communication between the first UE and the network entity via the second UE, and wherein transmitting the first control message is based at least in part on both the first measurement report and the second measurement report.

20. The apparatus of claim 15, wherein the instructions are further executable by the at least one processor to cause the apparatus to:

transmit, to the first UE, a third control message associated with the switch from the direct communication between the first UE and the network entity to the indirect communication between the first UE and the network entity via the second UE, wherein the third control message includes a second set of parameters associated with the switch.

21. The apparatus of claim 20, wherein the third control message is transmitted prior to the first control message, wherein transmitting the third control message is based at least in part on the first measurement report, and wherein transmitting the first control message is based at least in part on the second measurement report.

22. The apparatus of claim 15, wherein the instructions are further executable by the at least one processor to cause the apparatus to:

transmit data to, or receive data from, the second UE in accordance with the indirect communication between the first UE and the network entity via the second UE and the sidelink carrier aggregation between the first UE and the second UE.

23. A method for wireless communication at a first user equipment (UE), comprising:

receiving, from a second UE, a first set of one or more synchronization signals via a first component carrier and a second set of one or more synchronization signals via a second component carrier;

transmitting a first measurement report indicative of one or more first measurements on the first set of one or more synchronization signals and a second measurement report indicative of one or more second measurements on the second set of one or more synchronization signals; and receiving a control message associated with indirect communication between the first UE and a network entity via the second UE, wherein the control message includes a set of parameters for activating sidelink carrier aggregation between the first UE and the second UE based at least in part on the one or more first measurements indicated by the first measurement report and the one or more second measurements indicated by the second measurement report, wherein the sidelink carrier aggregation is activated based at least in part on a switch from direct communication between the first UE and the network entity to the indirect communication between the first UE and the network entity.

24. The method of claim 23, further comprising:
establishing a sidelink connection between the first UE and the second UE based at least in part on the control message, wherein the control message further includes a second set of parameters associated with the switch from the direct communication between the first UE and the network entity to the indirect communication between the first UE and the network entity via the second UE.

25. The method of claim 23, further comprising:
receiving a second control message associated with the switch from the direct communication between the first UE and the network entity to the indirect communication between the first UE and the network entity via the second UE, wherein the second control message includes a second set of parameters associated with the switch; and
establishing a sidelink connection between the first UE and the second UE based at least in part on the second control message.

26. The method of claim 23, further comprising:
receiving, from the network entity, a request to measure the second set of one or more synchronization signals via the second component carrier and to transmit the second measurement report, wherein receiving the second set of one or more synchronization signals and transmitting the second measurement report is based at least in part on receiving the request.

27. The method of claim 23, further comprising:
transmitting a second control message responsive to the control message, wherein the second control message indicates a completion of a sidelink connection between the first UE and the second UE and indicates the activation of the sidelink carrier aggregation for the sidelink connection.

28. The method of claim 23, further comprising:
receiving, from the second UE and in accordance with a sidelink connection establishment procedure, a random access channel message based at least in part on a radio frequency band of a sidelink connection between the first UE and the second UE; and
transmitting, to the second UE, a random access channel response message based at least in part on receiving the random access channel message.

29. The method of claim 23, further comprising:
transmitting data to, or receiving data from, the network entity via the second UE in accordance with the indirect communication between the first UE and the network entity via the second UE and the sidelink carrier aggregation between the first UE and the second UE.

* * * * *